(12) United States Patent
Melton

(10) Patent No.: US 9,380,029 B1
(45) Date of Patent: Jun. 28, 2016

(54) SECURITY-FOCUSED MONITORING SYSTEM

(71) Applicant: Knight Security Systems, Austin, TX (US)

(72) Inventor: Adam Melton, Austin, TX (US)

(73) Assignee: Knight Security Systems, Austin, TX (US)

( * ) Notice: Subject to any disclaimer, the term of this patent is extended or adjusted under 35 U.S.C. 154(b) by 0 days.

(21) Appl. No.: 14/564,393

(22) Filed: Dec. 9, 2014

(51) Int. Cl.
G06F 21/00 (2013.01)
H04L 29/06 (2006.01)
G06F 21/56 (2013.01)

(52) U.S. Cl.
CPC .......... H04L 63/0272 (2013.01); G06F 21/567 (2013.01); H04L 63/1416 (2013.01)

(58) Field of Classification Search
CPC ......... G06F 21/50; G06F 21/55; G06F 21/56; G06F 21/567; G06F 21/552; G06F 21/554
See application file for complete search history.

(56) References Cited

U.S. PATENT DOCUMENTS

| 2002/0087882 | A1* | 7/2002 | Schneier ............... G06F 21/552 726/23 |
| 2002/0099958 | A1* | 7/2002 | Hrabik ................ H04L 63/1416 726/22 |
| 2005/0105508 | A1* | 5/2005 | Saha ................. H04L 29/12009 370/352 |

* cited by examiner

Primary Examiner — Edward Zee
(74) Attorney, Agent, or Firm — William N. Hulsey, III; Jeffrey D. Hunt; Hulsey Hunt & Parks, P.C.

(57) ABSTRACT

In some implementations, data from security monitoring devices of a facility is collected and analyzed within the facility and the results of the analysis is transmitted to another computer that is outside of the facility via a non-VPN communication path.

17 Claims, 24 Drawing Sheets

800

800

800

SECURITY-FOCUSED MONITORING SYSTEM

FIELD

This disclosure relates generally to facility security systems.

BACKGROUND

FIG. 1 is a block diagram of a prior art system 100, according to an implementation. The system 100 includes a processor 104. A first external device 106 is physically located in the facility 102. An example of the first external device 106 is a physical security monitoring device, such as cameras, fiber optic cable, security network switches, uninterruptible power supplies and security server hard drives.

Data from the first external device 106 is transmitted to a second external device 108 over a virtual private network 110. Data from the first external device 106 is transmitted outside the facility 102. The first external device 106 is connected to a computer firewall 112 in the facility 102.

A second external device 108 is external to the facility 102. The second external device 108 is physically located outside the facility 102. Data from the first external device 106 is transmitted to the computer firewall 112.

The second external device 108 includes a sentry component 114 that is operably coupled to the processor 104. The sentry component 114 performs security monitoring functions of the first external device 106, which yield security monitoring second external device 108 also includes a remediation component 116. The remediation component 116 performs remediation functions on the first external device 106 in reference and in response to the data from the first external device 106, which yields remediation results.

Because data from the first external device 106 is transmitted outside the facility 102, the security monitoring functions of the first external device 106 are performed in the second external device 108. Data from the first external device 106 must be transmitted through the VPN 110 or stored outside of the facility 102. The VPN 110 presents a serious risk to the facility 102.

BRIEF DESCRIPTION

In one aspect, data from security monitoring devices of a facility is collected and analyzed within the facility and the results of the analysis is transmitted to another computer that is outside of the facility via a non-VPN communication path.

In another aspect, a sentry device for monitoring electronic security devices for a facility includes a processor, a first communication port that is operably coupled to the processor and operable to establish a first communication path to a first external device, the first external device being external to the sentry device, the first external device being physically located in the facility, the first communication path not being a virtual private network, the first communication path not including a computer firewall and the first communication path operable to communicate status data of the first external device, a second communication port that is operably coupled to the processor and operable to establish a second communication path to a second external device, the second external device being external to the sentry device, the second external device being physically located in the facility, the second communication path not being a virtual private network, the second communication path including a computer firewall, a sentry component that is operably coupled to the processor, that is operably coupled to the first communication port and that is operably coupled to the second communication port, the sentry component including processor-executable instructions that are operable to perform security monitoring functions of the first external device, yielding security monitoring results and transmitting the security monitoring results through the second communication path.

In yet another aspect, an auto-remediation device for monitoring electronic security devices for a facility includes a processor, a first communication port that is operably coupled to the processor and operable to establish a first communication path to a first external device, the first external device being external to the auto-remediation device, the first external device being physically located in the facility, the first communication path not being a virtual private network, the first communication path not including a computer firewall, a second communication port that is operably coupled to the processor and operable to establish a second communication path to a second external device, the second external device being external to the auto-remediation device, the second external device being physically located in the facility, the second communication path not being a virtual private network, the second communication path including a computer firewall, and an auto-remediation component that is operably coupled to the processor, that is operably coupled to the first communication port and that is operably coupled to the second communication port, the auto-remediation component including processor-executable instructions that are operable to perform remediation functions on the first external device without intervention by another entity, yielding remediation results, and transmitting the remediation results through the second communication path.

In a further aspect, a method of monitoring electronic security devices for a facility includes establishing a first communication path to a first external device via a first communication port, the first external device being external to the first communication port, the first communication path not being a virtual private network, the first communication path not including a computer firewall and the first communication path operable to communicate status data of the first external device, establishing a second communication path to a second external device via a second communication port, the second external device being external to the second communication port, the second communication path not being a virtual private network, the second communication path including a computer firewall, performing security monitoring functions of the first external device in reference to the status data of the first external device, yielding security monitoring results, and transmitting the security monitoring results through the second communication path to the second external device.

DETAILED DESCRIPTION

Figure 1:
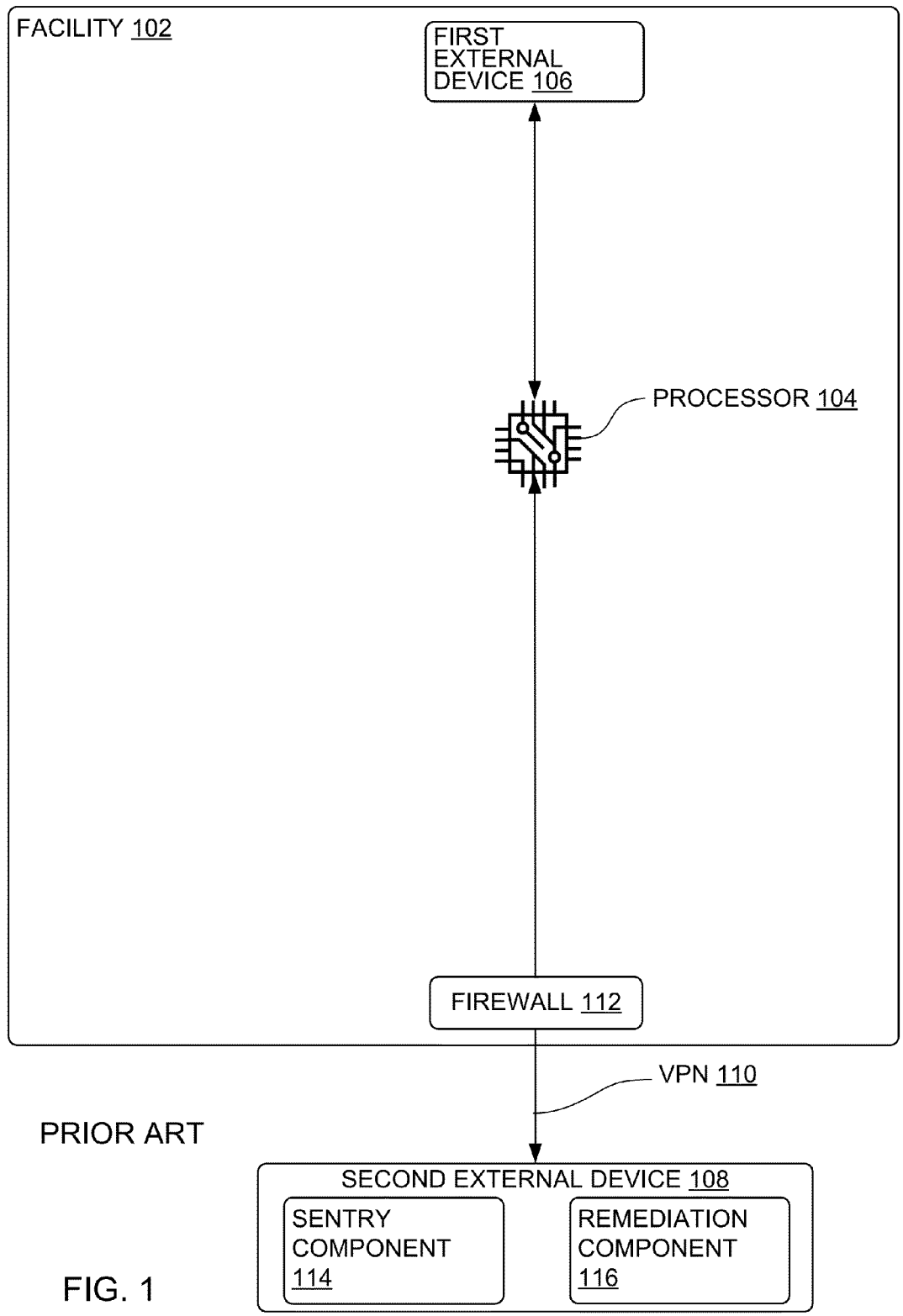
FIG. 1 is a block diagram of a prior art system, according to an implementation.

It will be appreciated that for simplicity and clarity of illustration, where considered appropriate, reference numerals may be repeated among the figures to indicate corresponding or analogous elements. In addition, numerous specific details are set forth in order to provide a thorough understanding of the implementations described herein. However, it will be understood by those of ordinary skill in the art that the implementations described herein may be practiced without these specific details. In other instances, well-known methods, procedures and components have not been described in detail so as not to obscure the implementations described herein. Also, the description is not to be considered as limiting the scope of the implementations described herein.

In the following detailed description, reference is made to the accompanying drawings that form a part hereof, and in which is shown by way of illustration specific implementations which may be practiced. These implementations are described in sufficient detail to enable those skilled in the art to practice the implementations, and it is to be understood that other implementations may be utilized and that logical, mechanical, electrical and other changes may be made without departing from the scope of the implementations. The following detailed description is, therefore, not to be taken in a limiting sense.

The detailed description is divided into five sections. In the first section, a system level overview is described. In the second section, implementations of apparatus are described. In the third section, implementations of methods are described. In the fourth section, hardware and the operating environments in conjunction with which implementations may be practiced are described. Finally, in the fifth section, a conclusion of the detailed description is provided.

System Level Overview

The system level overview of the operation of an implementation is described in this section of the detailed description.

Figure 2:
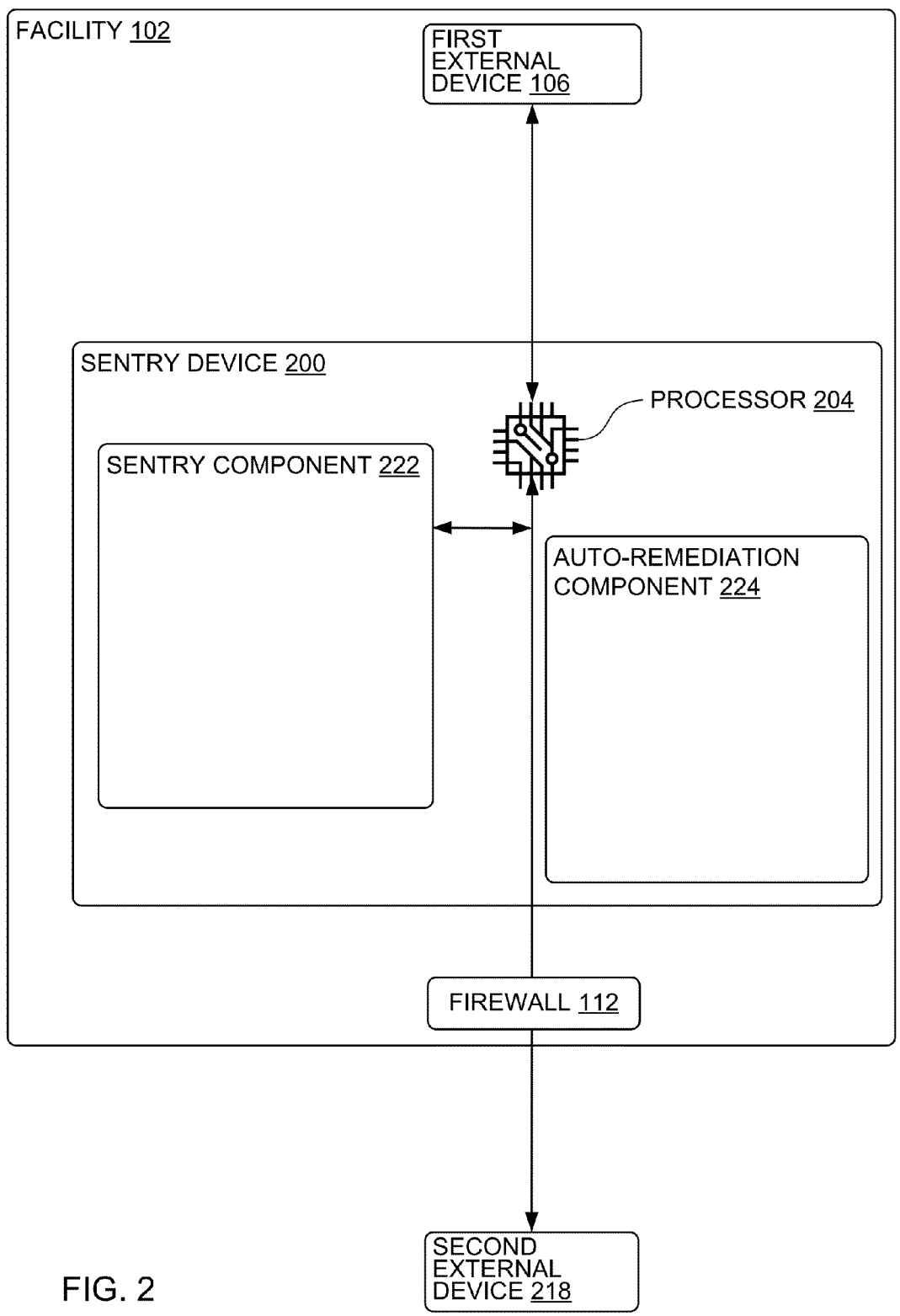
FIG. 2 is a block diagram of an overview of a sentry device, according to an implementation.

FIG. 2 is a block diagram of an overview of a sentry device 200, according to an implementation.

The sentry device 200 provides monitoring electronic security devices for a facility 102.

The sentry device 200 includes a processor 204.

The first external device 106 is external to the sentry device 200 and within the facility 102. The first external device 106 is physically located in the facility 102. Data from the first external device 106 is not transmitted any further than the sentry device 200. Data from the first external device 106 is not transmitted to the second external device 218. Data from the first external device 106 is not transmitted outside the facility 102. The first external device 106 is not connected to a computer firewall.

A second external device 218 is external to the sentry device 200. The second external device 218 is physically located outside the facility 102. No a virtual private network exists between the sentry device 200 and the second external device 218. A computer firewall 112 exists between the sentry device 200 and the second external device 218. Data from the first external device 106 is not transmitted to the computer firewall 112.

The sentry device 200 also includes a sentry component 222 that is operably coupled to the processor 204. The sentry component performs security monitoring functions of the first external device 106, which yield security monitoring results. The processor-executable instructions are operable to transmit the security monitoring results to the second external device 218.

The sentry device 200 also includes an auto-remediation component 224 that is operably coupled to the processor 204. The auto-remediation component 224 performs auto-remediation functions 402 on the first external device 106 in reference and in response to the status data 306, which yields remediation results 404. The processor-executable instructions are operable to transmit the remediation results 404 to the second external device 218.

Because data from the first external device 106 is not transmitted any further than the sentry device 200, the data from the first external device 106 is not transmitted to the second external device 218, the data from the first external device 106 is not transmitted outside the facility 102 and the security monitoring functions of the first external device 106 are performed in the sentry device 200 in the facility 102. It is most important that the data from the first external device 106 not be transmitted or stored outside of the facility 102 and it is also important that data from the first external device 106 not be transmitted or stored outside of the sentry device 200 so that no virtual private network through the computer firewall 112 is required to access data from the first external device 106. Instead, it is most important that the security monitoring functions are performed on data from the first external device 106 is processed in the facility 102 and it is also important that the security monitoring functions are performed on the data from the first external device 106 by the sentry device 200 so that only the security monitoring results need to be transmitted out of the facility 102 and the sentry device 200 in order for difficulties that are shown and evidenced by the data from the first external device 106 to be recognized by the second external device.

Apparatus

Figure 3:
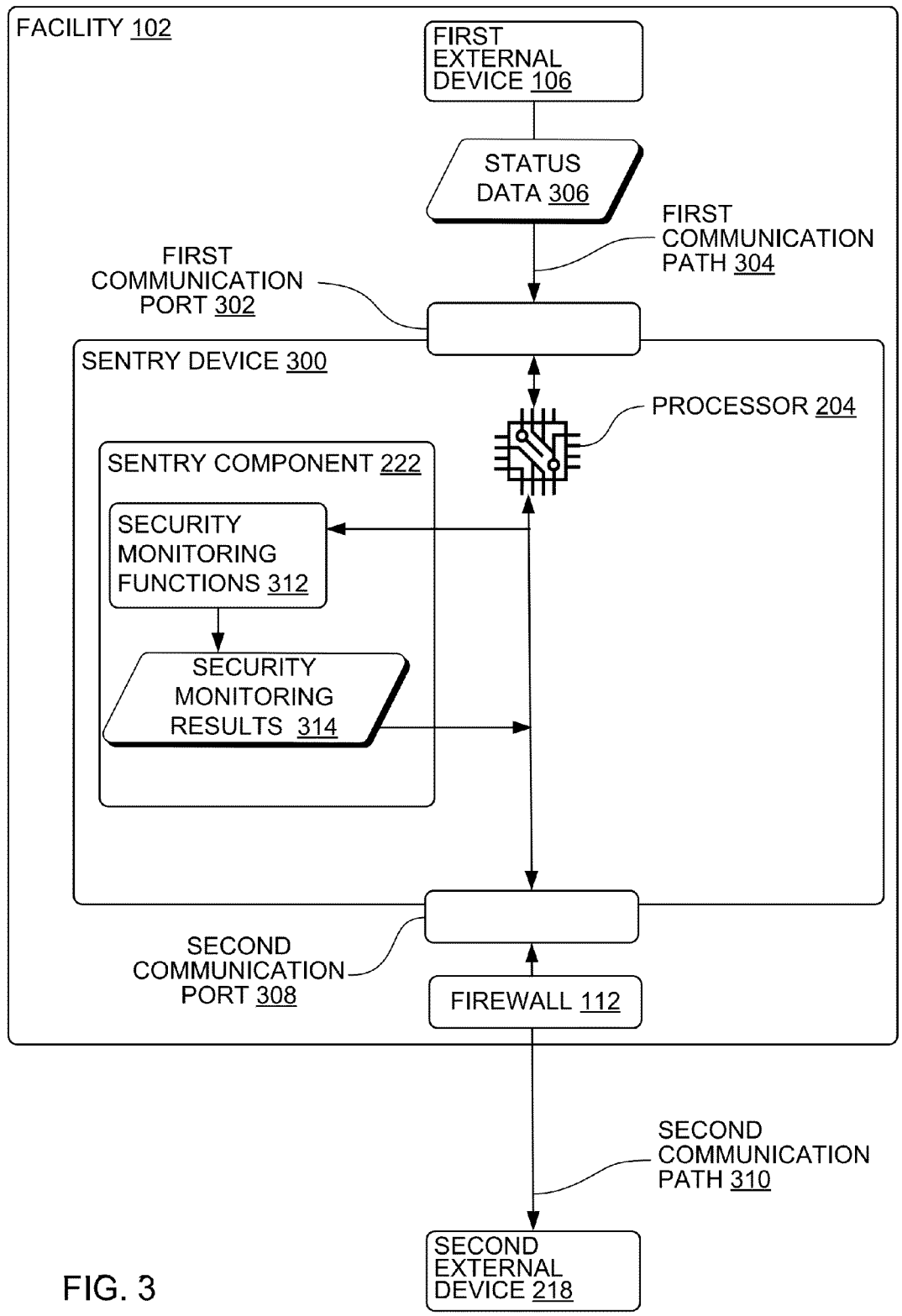
FIG. 3 is a block diagram of a sentry device, according to an implementation.

FIG. 3 is a block diagram of a sentry device 300, according to an implementation.

The sentry device 300 provides monitoring electronic security devices for a facility 102.

The sentry device 300 includes a processor 204.

The sentry device 300 also includes a first communication port 302. The first communication port 302 is operably coupled to the processor 204. The first communication port 302 is operable to establish a first communication path 304 to a first external device 106. The first external device 106 is external to the sentry device 300. The first external device 106 is physically located in the facility 102. The first communication path 304 is operable to communicate status data 306 of the first external device 106. The status data 306 is not transmitted any further than the sentry device 300. The status data 306 is not transmitted to the second external device 218. The status data 306 is not transmitted outside the facility 102. The first communication path 304 is not a virtual private network. The first communication path 304 does not include a computer firewall.

The sentry device 300 also includes a second communication port 308. The second communication port 308 is operably coupled to the processor 204. The second communication port 308 is operable to establish a second communication path 310 to a second external device 218. The second external device 218 is external to the sentry device 300. The second external device 218 is physically located outside the facility 102. The second communication path 310 is not a virtual private network. The second communication path 310 includes a computer firewall 112. The status data 306 is not transmitted to the computer firewall 112.

The sentry device 300 also includes a sentry component 222 that is operably coupled to the processor 204. The sentry component 222 is operably coupled to the first communication port 302, such as through the processor 204, such as shown in FIG. 3. The sentry component 222 is operably coupled to the second communication port 308, such as through the processor 204, such as shown in FIG. 3. The sentry component 222 includes processor-executable instructions that are operable to perform security monitoring functions 312 of the first external device 106, which yield security monitoring results 314. The processor-executable instructions are operable to transmit the security monitoring results 314 through the second communication path 310 to the second external device 218.

Because the status data 306 is not transmitted any further than the sentry device 300, the status data 306 is not transmitted to the second external device 218, the status data 306 is not transmitted outside the facility 102 and thus the security monitoring functions 312 of the first external device 106 are performed in the sentry device 300 in the facility 102. It is most important that the status data 306 not be transmitted or stored outside of the facility 102 and it is also important that the status data 306 not be transmitted or stored outside of the sentry device 300 so that no virtual private network through the computer firewall 112 is required to access the status data 306. Instead, it is most important that the security monitoring functions 312 are performed on the status data 306 and the security monitoring functions 312 are processed in the facility 102 and it is also important that the security monitoring functions 312 are performed on the status data 306 by the sentry device 300 so that only the security monitoring results 314 need to be transmitted out of the facility 102 and the sentry device 300 in order for difficulties that are shown and evidenced by the status data 306 to be recognized by the second external device.

Figure 4A:
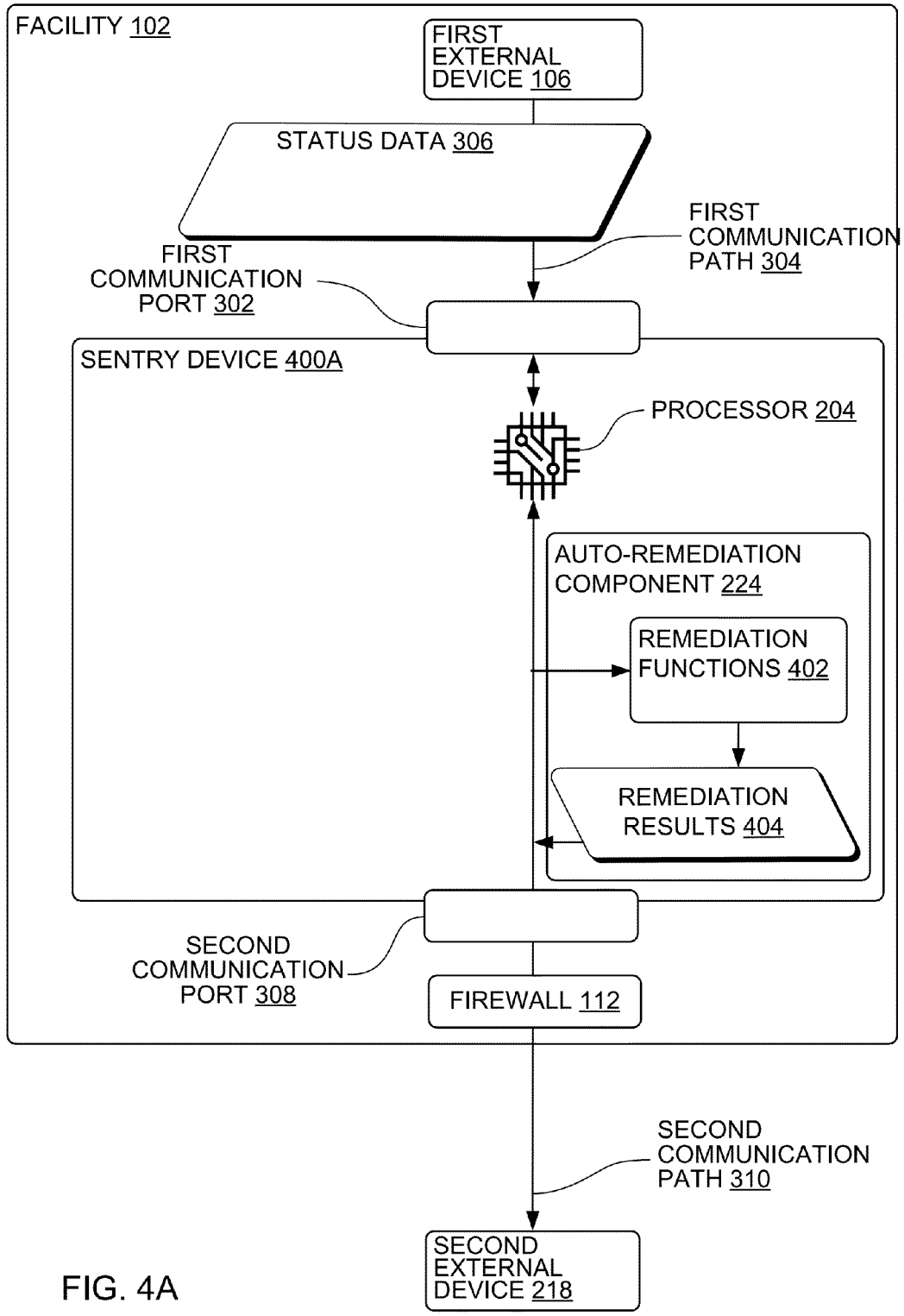
FIG. 4A is a block diagram of a system that includes a sentry device, according to an implementation.

FIG. 4A is a block diagram of a system that includes a sentry device 400A, according to an implementation.

The sentry device 400A provides monitoring electronic security devices for a facility 102.

The sentry device 400A includes a processor 204.

The sentry device 400A also includes a first communication port 302. The first communication port 302 is operably coupled to the processor 204. The first communication port 302 is operable to establish a first communication path 304 to a first external device 106. The first external device 106 is external to the sentry device 400A. The first external device 106 is physically located in the facility 102. The first communication path 304 is operable to communicate status data 306 of the first external device 106. The status data 306 is not transmitted any further than the sentry device 400A. The status data 306 is not transmitted to the second external device 218. The status data 306 is not transmitted outside the facility 102. The first communication path 304 is not a virtual private network. The first communication path 304 does not include a computer firewall.

The sentry device 400A also includes a second communication port 308. The second communication port 308 is operably coupled to the processor 204. The second communication port 308 is operable to establish a second communication path 310 to a second external device 218. The second external device 218 is external to the sentry device 400A. The second external device 218 is physically located outside the facility 102. The second communication path 310 is not a virtual private network. The second communication path 310 includes a computer firewall 112. The status data 306 is not transmitted to the computer firewall 112.

The sentry device 400A also includes an auto-remediation component 224 that is operably coupled to the processor 204. The auto-remediation component 224 performs auto-remediation functions 402 of the first external device 106, which yields remediation results 404. The processor-executable instructions are operable to transmit the remediation results 404 to the second external device 218.

Because the status data 306 is not transmitted any further than the sentry device 400A, the status data 306 is not transmitted to the second external device 218 and is not transmitted outside the facility 102, the auto-remediation functions 402 of the first external device 106 are performed in the sentry device 400A in the facility 102. It is most important that the status data 306 not be transmitted or stored outside of the facility 102 and it is also important that the status data 306 not be transmitted or stored outside of the sentry device 400A so that no virtual private network through the computer firewall 112 is required to access the status data 306. Instead, it is most important that the auto-remediation functions 402 are performed on the status data 306 in the facility 102 and it is also important that the auto-remediation functions 402 are performed on the status data 306 by the sentry device 400A so that only the remediation results 404 need to be transmitted out of the facility 102 and the sentry device 400A in order for difficulties that are shown and evidenced by the status data 306 to be corrected by the second external device.

Figure 4B:
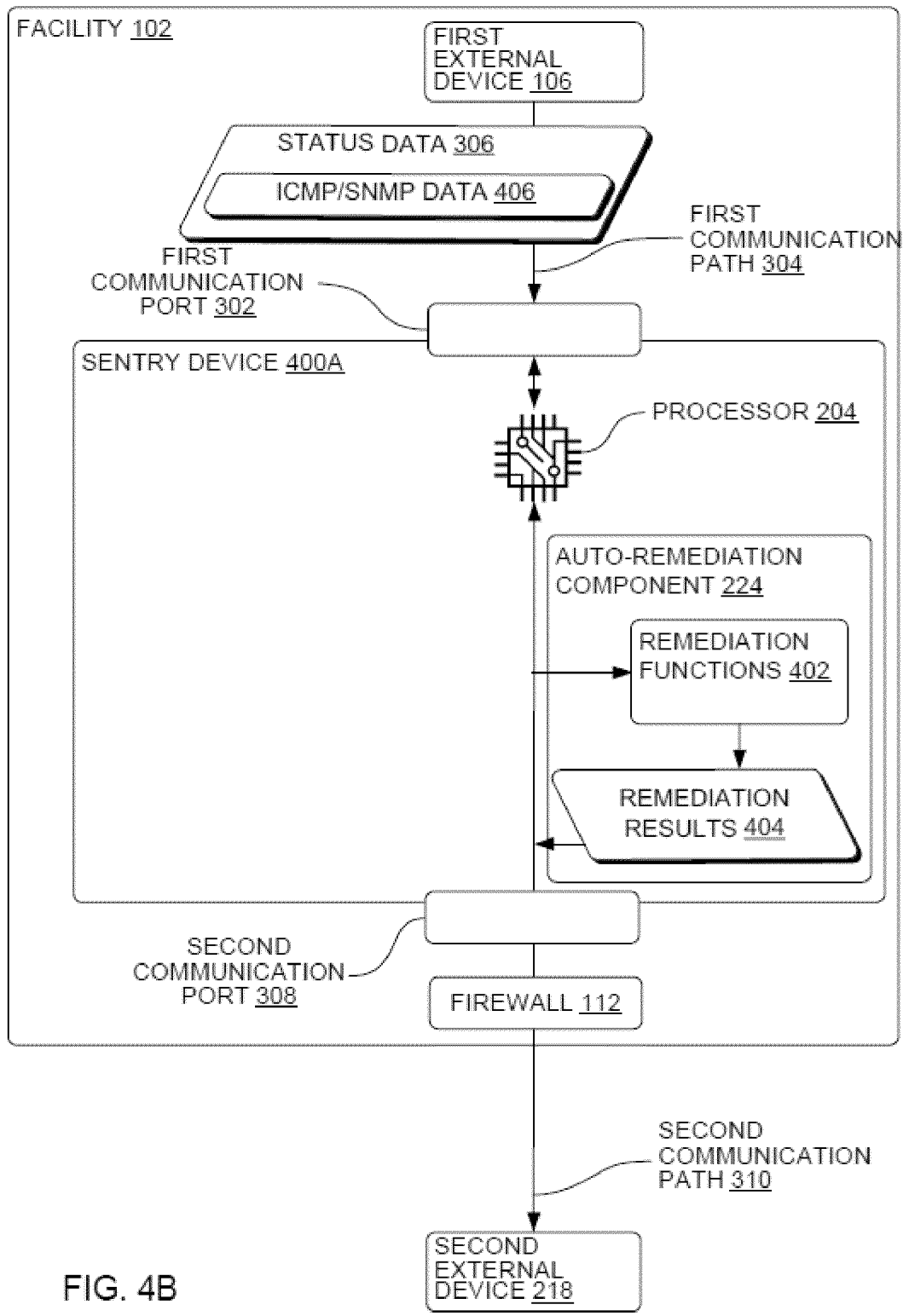
FIG. 4B is a block diagram of a system that includes a sentry device and ICMP/SNMP data, according to an implementation.

FIG. 4B is a block diagram of a system that includes a sentry device 400B and ICMP/SNMP data, according to an implementation. The sentry device 400B provides monitoring electronic security devices for a facility 102. The sentry device 400B includes a processor 204. The sentry device 400B also includes a first communication port 302. The first communication port 302 is operably coupled to the processor 204. The first communication port 302 is operable to establish a first communication path 304 to a first external device 106. The first external device 106 is external to the sentry device 400B. The first external device 106 is physically located in the facility 102. The first communication path 304 is operable to communicate status data 306 of the first external device 106. The status data 306 includes ICMP or SNMP data 406. The status data 306 is not transmitted any further than the sentry device 400B. The status data 306 is not transmitted to the second external device 218. The status data 306 is not transmitted outside the facility 102. The first communication path 304 is not a virtual private network. The first communication path 304 does not include a computer firewall. The sentry device 400B also includes a second communication port 308. The second communication port 308 is operably coupled to the processor 204. The second communication port 308 is operable to establish a second communication path 310 to a second external device 218. The second external device 218 is external to the sentry device 400B. The second external device 218 is physically located outside the facility 102. The second communication path 310 is not a virtual private network. The second communication path 310 includes a computer firewall 112. The status data 306 is not transmitted to the computer firewall 112. The sentry device 400B also includes an auto-remediation component 224 that is operably coupled to the processor 204. The auto-remediation component 224 performs auto-remediation functions 402 of the first external device 106, which yields remediation results 404. The processor-executable instructions are operable to transmit the remediation results 404 to the second external device 218. Because the status data 306 is not transmitted any further than the sentry device 400B, the status data 306 is not transmitted to the second external device 218 and is not transmitted outside the facility 102, the auto-remediation functions 402 of the first external device 106 are performed in the sentry device 400B in the facility 102. It is most important that the status data 306 not be transmitted or stored outside of the facility 102 and it is also important that the status data 306 not be transmitted or stored outside of the sentry device 400B so that no virtual private network through the computer firewall 112 is required to access the status data 306. Instead, it is most important that the auto-remediation functions 402 are performed on the status data 306 in the facility 102 and it is also important that the auto-remediation functions 402 are performed on the status data 306 by the sentry device 400B so that only the remediation results 404 need to be transmitted out of the facility 102 and the sentry device 400B in order for difficulties that are shown and evidenced by the status data 306 to be corrected by the second external device.

Figure 4C:
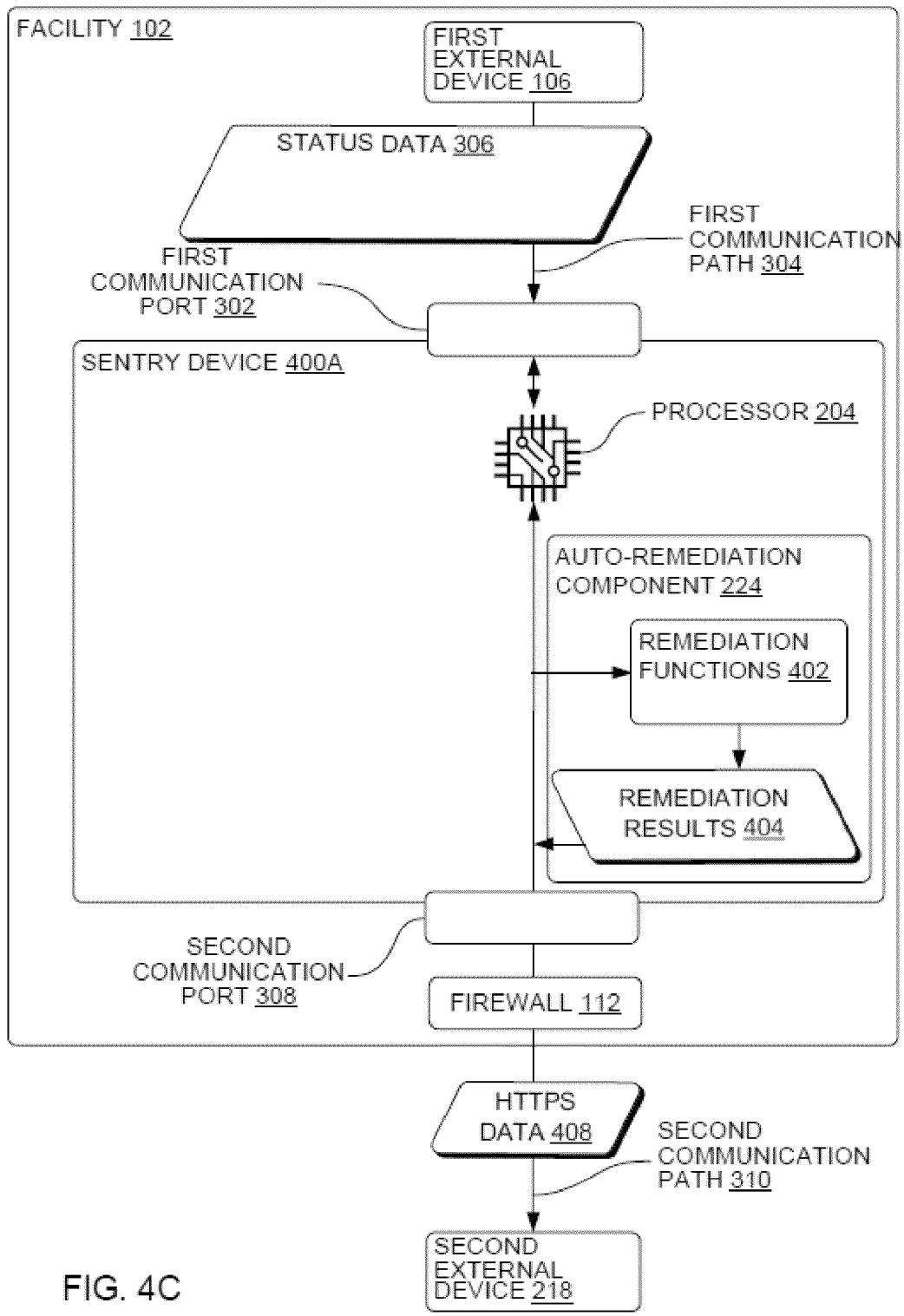
FIG. 4C is a block diagram of a system that includes a sentry device and HTTPS data, according to an implementation.

FIG. 4C is a block diagram of a system that includes a sentry device 400C and HTTPS data, according to an implementation. The sentry device 400C provides monitoring electronic security devices for a facility 102. The sentry device 400C includes a processor 204. The sentry device 400C also includes a first communication port 302. The first communication port 302 is operably coupled to the processor 204. The first communication port 302 is operable to establish a first communication path 304 to a first external device 106. The first external device 106 is external to the sentry device 400C. The first external device 106 is physically located in the facility 102. The first communication path 304 is operable to communicate status data 306 of the first external device 106. The status data 306 is not transmitted any further than the sentry device 400C. The status data 306 is not transmitted to the second external device 218. The status data 306 is not transmitted outside the facility 102. The first communication path 304 is not a virtual private network. The first communication path 304 does not include a computer firewall. The sentry device 400C also includes a second communication port 308. The second communication port 308 is operably coupled to the processor 204. The second communication port 308 is operable to establish a second communication path 310 to a second external device 218. The second external device 218 is external to the sentry device 400C. The second external device 218 is physically located outside the facility 102. The second communication path 310 is not a virtual private network. The second communication path 310 includes a computer firewall 112. The status data 306 is not transmitted to the computer firewall 112. The sentry device 400C also includes an auto-remediation component 224 that is operably coupled to the processor 204. The auto-remediation component 224 performs auto-remediation functions 402 of the first external device 106, which yields remediation results 404. The processor-executable instructions are operable to transmit the remediation results 404 via HTTPS encoded data 408 to the second external device 218. Because the status data 306 is not transmitted any further than the sentry device 400C, the status data 306 is not transmitted to the second external device 218 and is not transmitted outside the facility 102, the auto-remediation functions 402 of the first external device 106 are performed in the sentry device 400C in the facility 102. It is most important that the status data 306 not be transmitted or stored outside of the facility 102 and it is also important that the status data 306 not be transmitted or stored outside of the sentry device 400C so that no virtual private network through the computer firewall 112 is required to access the status data 306. Instead, it is most important that the auto-remediation functions 402 are performed on the status data 306 in the facility 102 and it is also important that the auto-remediation functions 402 are performed on the status data 306 by the sentry device 400C so that only the remediation results 404 need to be transmitted out of the facility 102 and the sentry device 400C in order for difficulties that are shown and evidenced by the status data 306 to be corrected by the second external device.

Figure 5:
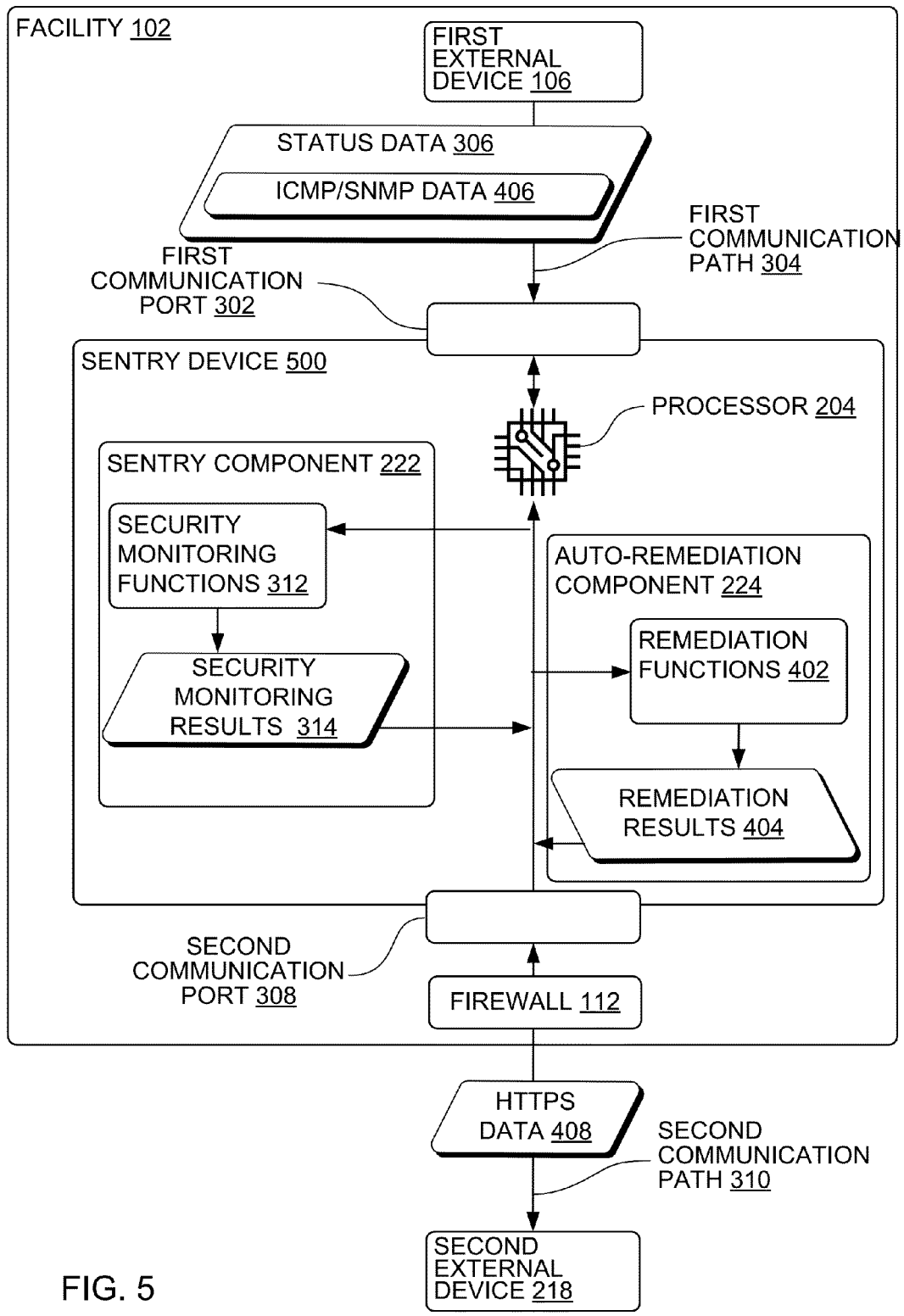
FIG. 5 is a block diagram of a system that includes a sentry device, according to an implementation.

FIG. 5 is a block diagram of a system that includes a sentry device 500, according to an implementation.

The sentry device 500 provides monitoring electronic security devices for a facility 102.

The sentry device 500 includes a processor 204.

The sentry device 500 also includes a first communication port 302. The first communication port 302 is operably coupled to the processor 204. The first communication port 302 is operable to establish a first communication path 304 to a first external device 106. The first external device 106 is external to the sentry device 500. The first external device 106 is physically located in the facility 102. The first communication path 304 is operable to communicate status data 306 of the first external device 106. The status data 306 includes ICMP or SNMP data 406. The status data 306 is not transmitted any further than the sentry device 500. The status data 306 is not transmitted to the second external device 218. The status data 306 is not transmitted outside the facility 102. The first communication path 304 is not a virtual private network. The first communication path 304 does not include a computer firewall.

The sentry device 500 also includes a second communication port 308. The second communication port 308 is operably coupled to the processor 204. The second communication port 308 is operable to establish a second communication path 310 to a second external device 218. The second external device 218 is external to the sentry device 500. The second external device 218 is physically located outside the facility 102. The second communication path 310 is not a virtual private network. The second communication path 310 includes a computer firewall 112. The status data 306 is not transmitted to the computer firewall 112.

The sentry device 500 also includes a sentry component 222 that is operably coupled to the processor 204. The sentry component 222 is operably coupled to the first communication port 302, such as through the processor 204, such as shown in FIG. 5. The sentry component 222 is operably coupled to the second communication port 308, such as through the processor 204, such as shown in FIG. 5. The sentry component 222 includes processor-executable instructions that are operable to perform security monitoring functions 312 of the first external device 106, which yield security monitoring results 314. The processor-executable instructions are operable to transmit the security monitoring results 314 through the second communication path 310 to the second external device 218.

The sentry device 200 also includes an auto-remediation component 224 that is operably coupled to the processor 204. The auto-remediation component 224 performs auto-remediation functions 402 on the first external device 106 in reference to the status data 306, which yields remediation results 404. The processor-executable instructions are operable to transmit the remediation results 404 via HTTPS encoded data 408 to the second external device 218.

Because the status data 306 is not transmitted any further than the sentry device 500, the status data 306 is not transmitted to the second external device 218 and the status data 306 is not transmitted outside the facility 102, thus the security monitoring functions 312 and the auto-remediation functions 402 of the first external device 106 are performed in the sentry device 500 in the facility 102. It is most important that the status data 306 not be transmitted or stored outside of the facility 102 and it is also important that the status data 306 not be transmitted or stored outside of the sentry device 500 so that no virtual private network through the computer firewall 112 is required to access the status data 306. Instead, it is most important that the security monitoring functions 312 and the auto-remediation functions 402 are performed on the status data 306 and that the security monitoring functions 312 and the auto-remediation functions 402 are processed in the facility 102 and it is also important that the security monitoring functions 312 are performed on the status data 306 by the sentry device 500 so that only the security monitoring results 314 and the remediation results 404 need to be transmitted out of the sentry device 500 and the facility 102 in order for difficulties that are shown, evidenced and corrected by the status data 306 to be recognized by the second external device.

Figure 6:
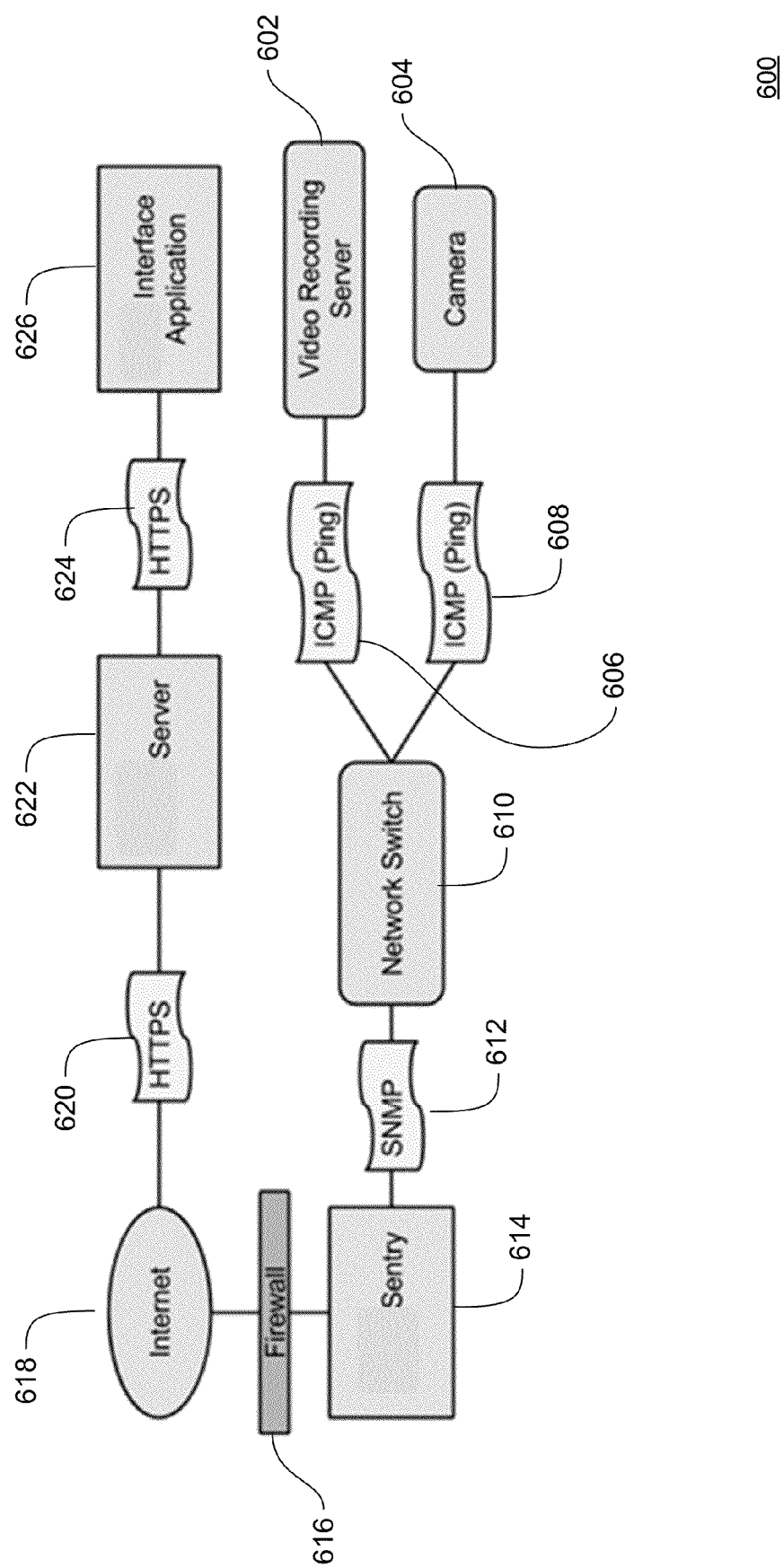
FIG. 6 is a block diagram of a network protocol to monitor electronic security devices of a facility, according to an implementation.

FIG. 6 is a block diagram of a sentry implementation to monitor electronic security devices of a facility, according to an implementation. FIG. 6 includes a first external device 106 that is physically located in the facility 102 and that is connected and communicates to the Sentry device 600 via either Internet Control Message Protocol (ICMP) or Simple Network Management Protocol (SNMP) 406 to a sentry 614, such as a sentry device 200, 300, 400A, 400B, 400C or 500 in FIG. 2-5, respectively. The sentry 614 communicates via a firewall, such as computer firewall 112 in FIG. 1-5, to the Internet 618, and thereafter via Hypertext Transfer Protocol Secure (HTTPS) messages 620 to a server 622 that is in a different facility that the sentry 614. Thereafter, the server 622 communicates via HTTPS messages 624 to an interface application 626.

Figure 7:
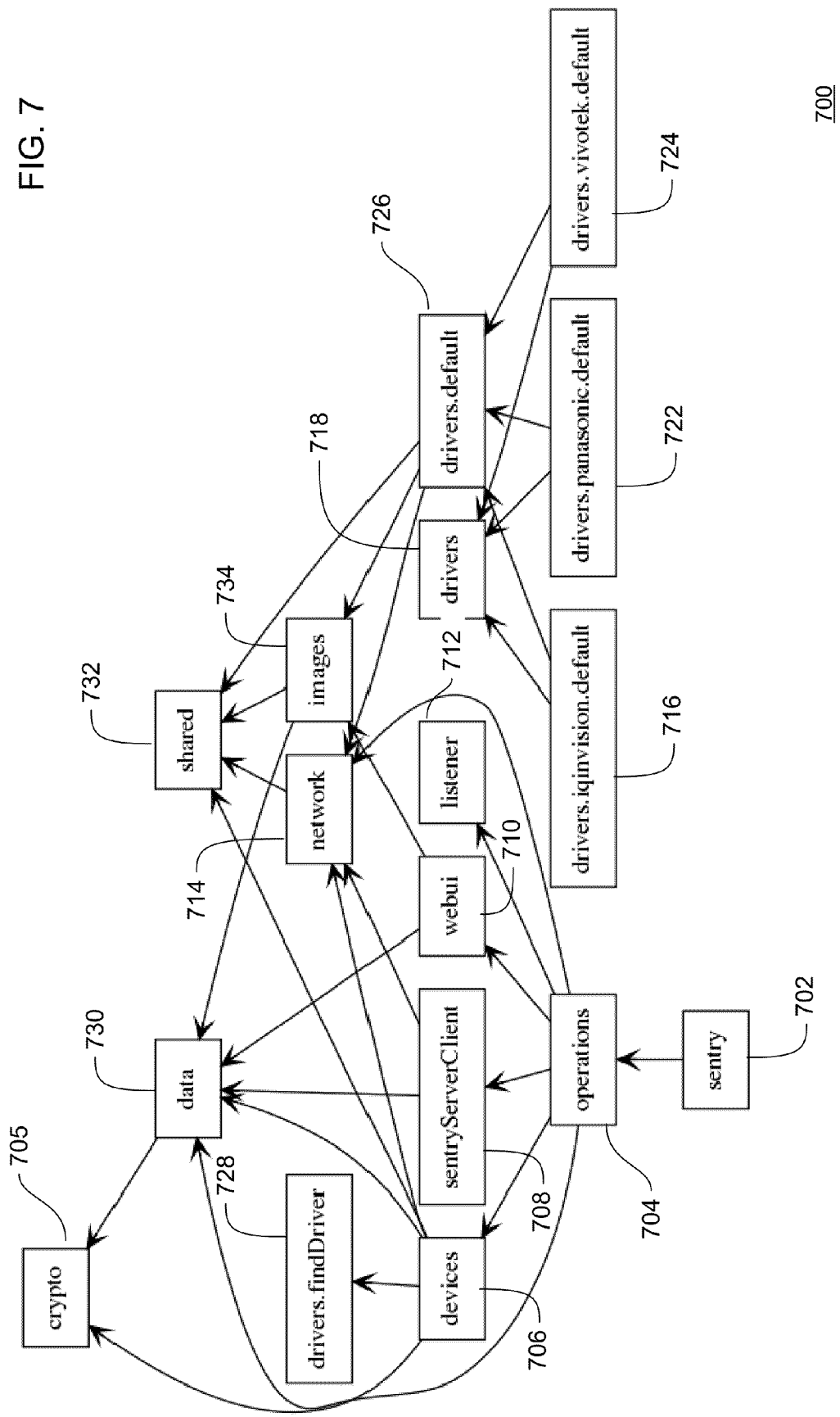
FIG. 7 is a block diagram of packages to monitor electronic security devices of a facility, according to an implementation.
Figure 8A:
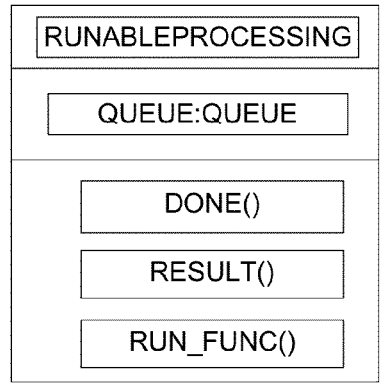
FIGS. 8A, 8B, 8C, 8D, 8E, 8F, 8G, 8H, and 8I is a series of block diagrams of components to monitor electronic security devices of a facility, according to an implementation.
Figure 8A:
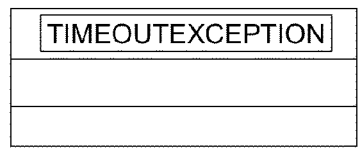
Figure 8A:
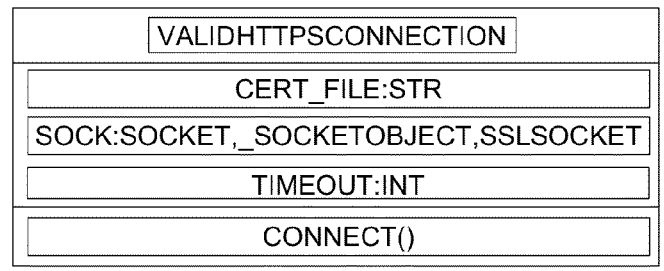
Figure 8A:
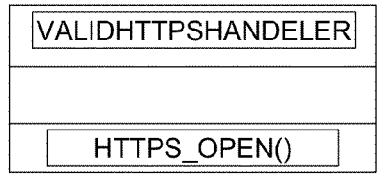
Figure 8B:
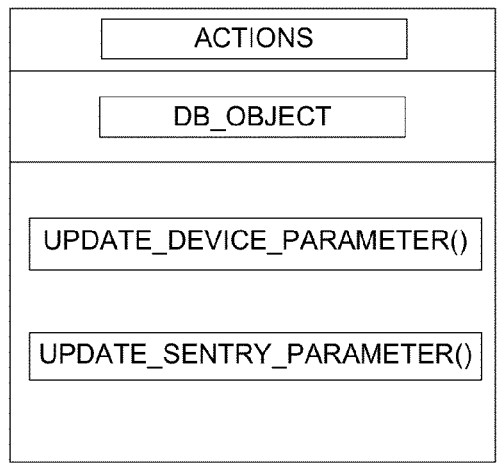
Figure 8B:
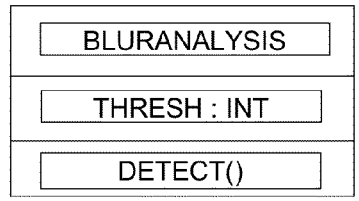
Figure 8B:
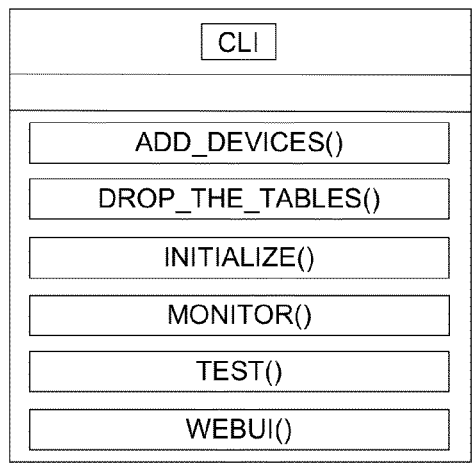
Figure 8C:
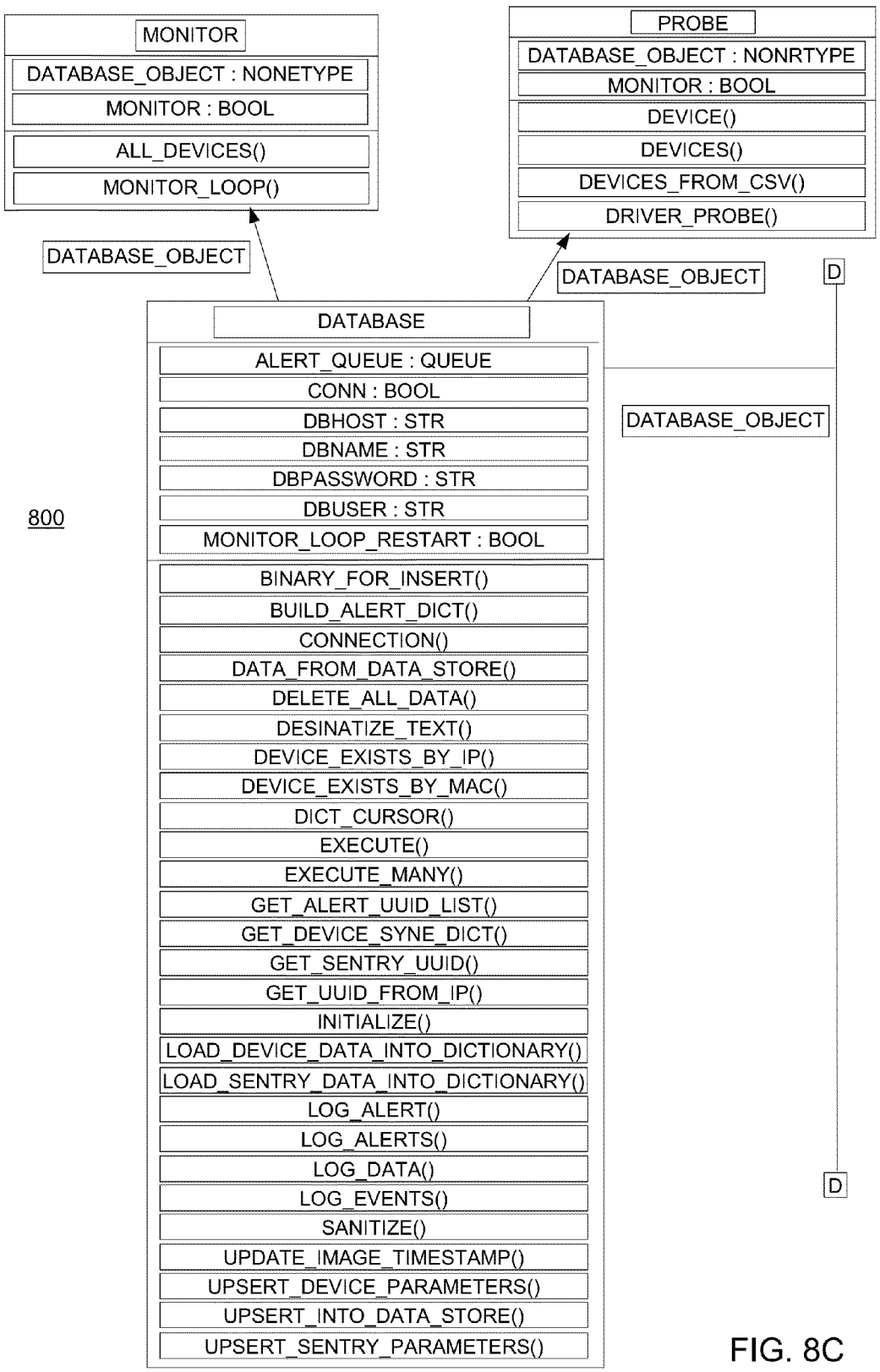
Figure 8D:
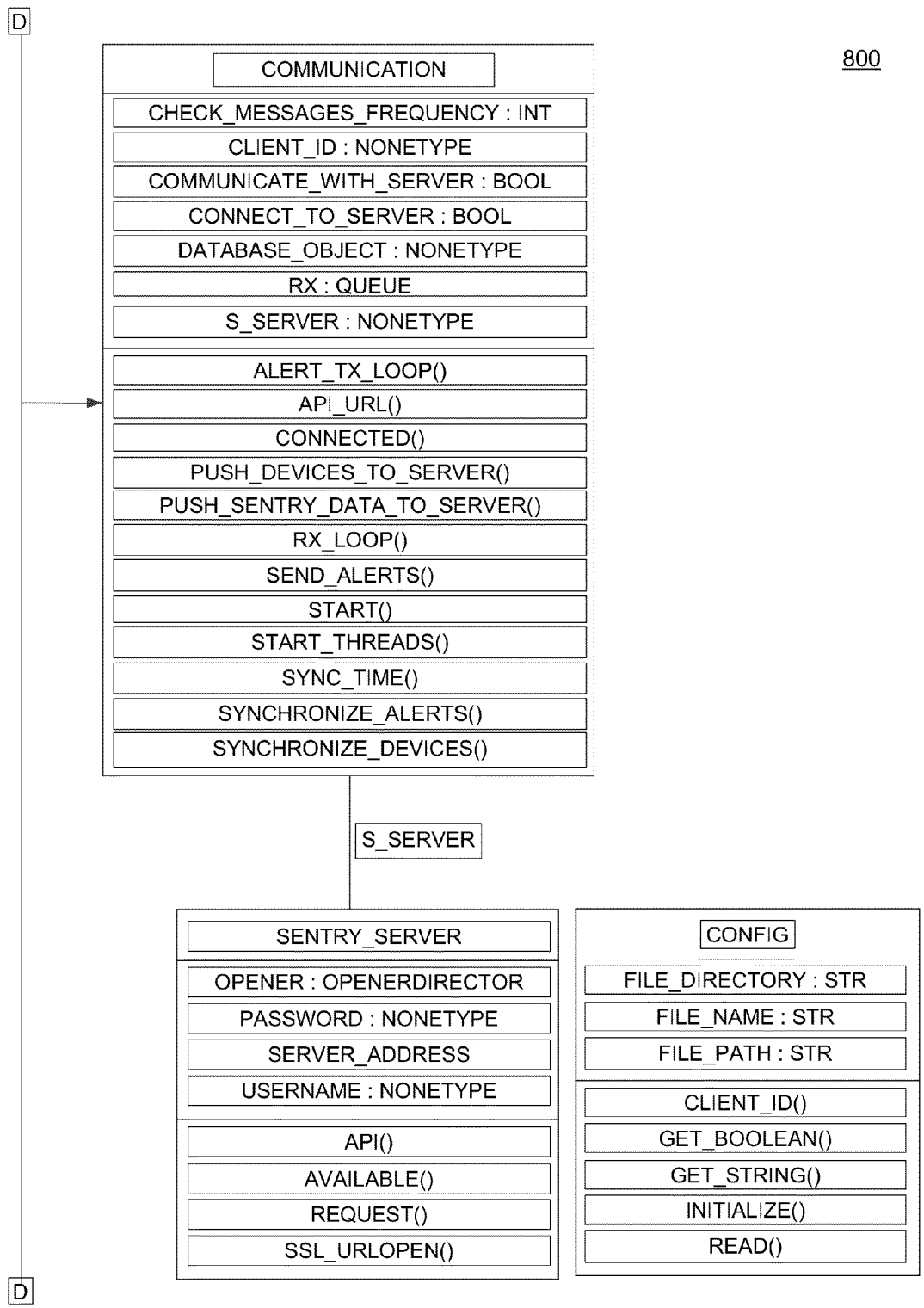
Figure 8E:
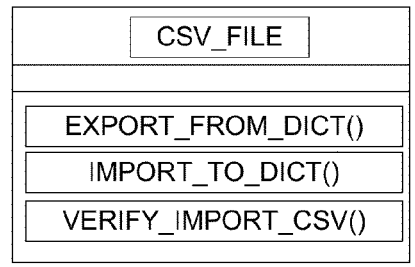
Figure 8E:
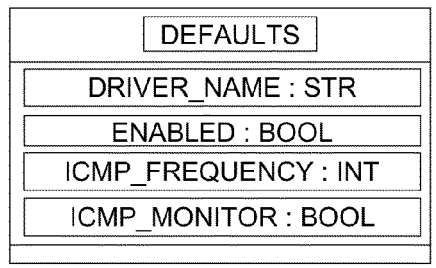
Figure 8E:
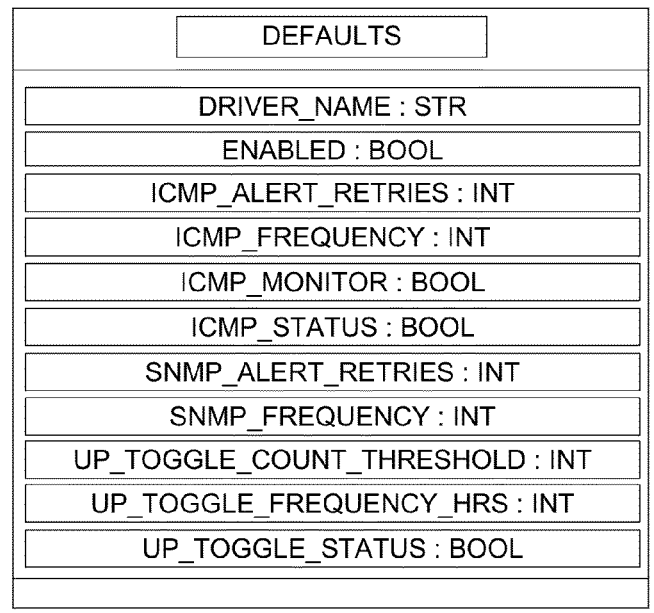
Figure 8E:
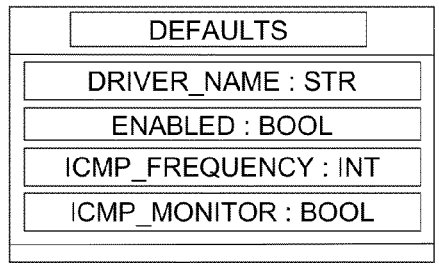
Figure 8F:
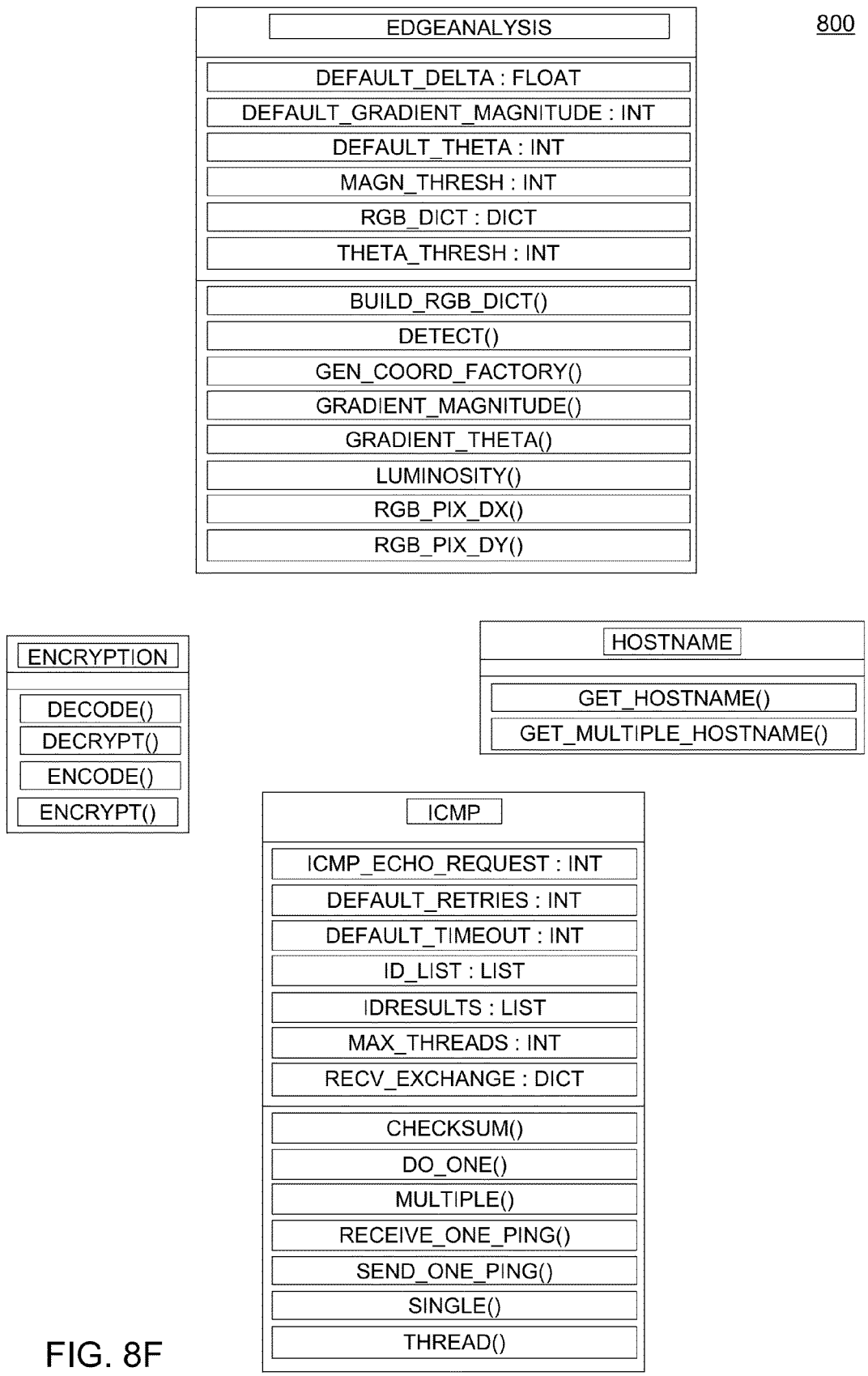
Figure 8G:
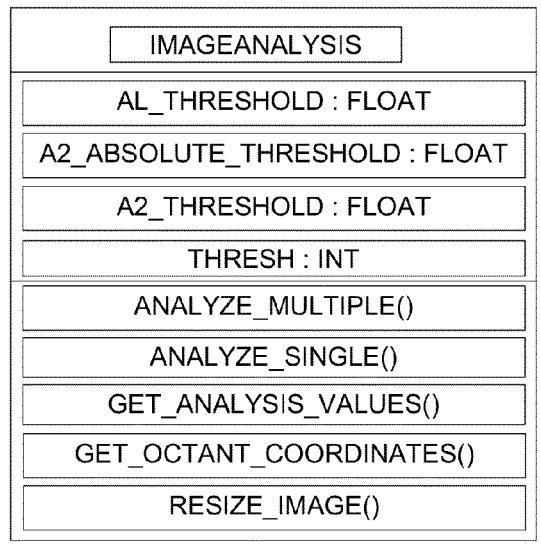
Figure 8G:
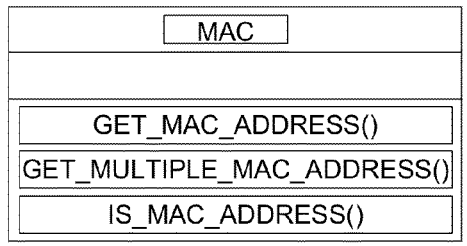
Figure 8G:
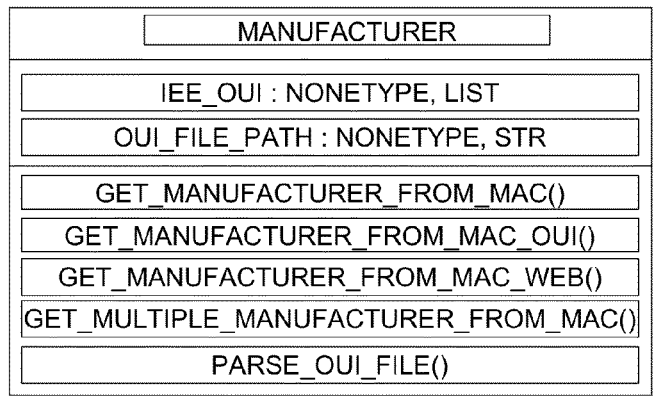
Figure 8H:
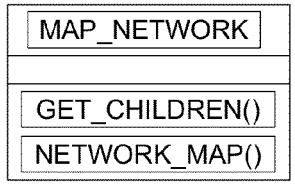
Figure 8H:
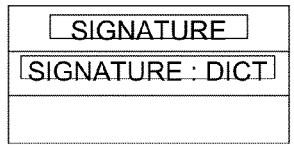
Figure 8H:
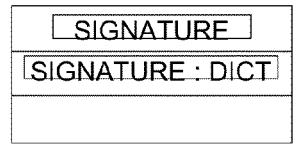
Figure 8H:
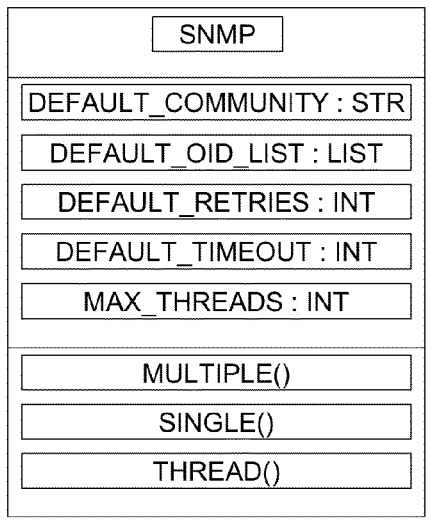
Figure 8H:
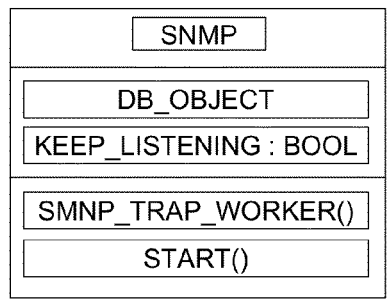
Figure 8I:
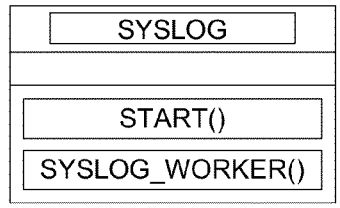
Figure 8I:
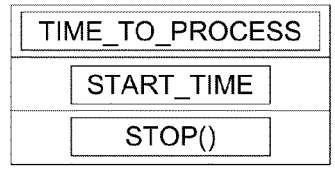
Figure 8I:
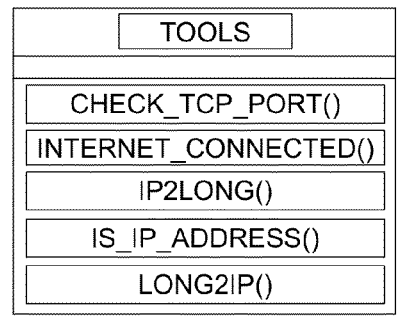
Figure 8I:
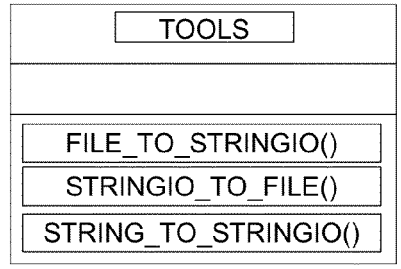

FIG. 7 is a block diagram of packages 700 to monitor electronic security devices of a facility, according to an implementation. In the packages 700, a sentry package 702 sends messages to an operations package 704. The operations package 704 sends messages to a cryptographic package 705, a devices package 706, a sentry server client package 708, a webUI package 710, a listener package 712 and a network package 714. A drivers IQ Invision package 716 sends messages to a drivers package 718 and a driver default package 720. A Panasonic default driver package 722 sends messages to the drivers package 718 and the driver default package 720. A Vivotek default drivers package 724 sends messages to the drivers package 718 and the driver default package 726. The devices package 706 sends messages to a find driver package 728, a data package 730, a shared package 732 and the network package 714. The sentry server client package 708 sends messages to the data package 730 and the network package 714. The webUI package 710 sends messages to the data package 730 and an images package 734. The driver default package 726 sends messages to the network package 714, the images package 734 and the shared package 732. The network package 714 sends messages to the shared package 732. The images package 734 sends messages to the data package 730, and the shared package 732. The data package 730 sends messages to the cryptographic package 705.

FIG. 8A-8I is a series of block diagrams of components to monitor electronic security devices of a facility, according to an implementation. The components in FIG. 8A-8I can be performed in facility 102 on sentry devices 200, 300, 400A, 400B, 400C and 500.

Method Implementations

In the previous section, a system level overview of the operation of an implementation is described. In this section, the particular methods of such an implementation are described by reference to a series of flowcharts. Describing the methods by reference to a flowchart enables one skilled in the art to develop such programs, firmware, or hardware, including such instructions to carry out the methods on suitable computers, executing the instructions from computer-readable media. Similarly, the methods performed by the server computer programs, firmware, or hardware are also composed of computer-executable instructions.

Figure 9:
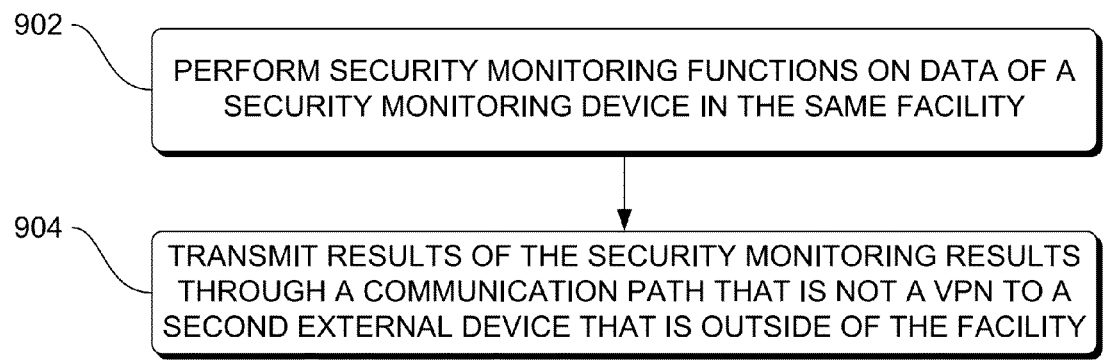
FIG. 9 is a block diagram of a method of monitoring electronic security devices for a facility, according to an implementation.

FIG. 9 is a block diagram of a method 900 of monitoring electronic security devices for a facility, according to an implementation.

Method 900 includes performing security monitoring functions, such as functions 312 in FIGS. 2 and 5, on data, such as status data 306 of FIG. 3-5, of a security monitoring device, such as first external device 106 in FIG. 1-5 in the same facility, such as facility 102, at block 902.

Method 900 thereafter includes transmitting results of the security monitoring functions, such as security monitoring results 314 in FIGS. 3 and 5, through a communication path that is not a VPN, such as second communication path 310 in FIG. 3-5, to a second external device, such as second external device 218 in FIG. 2-5, that is outside of the facility, at block 904.

In some implementations, method 900 is performed by the sentry component 222 in FIGS. 2-3 and 5.

Figure 10:
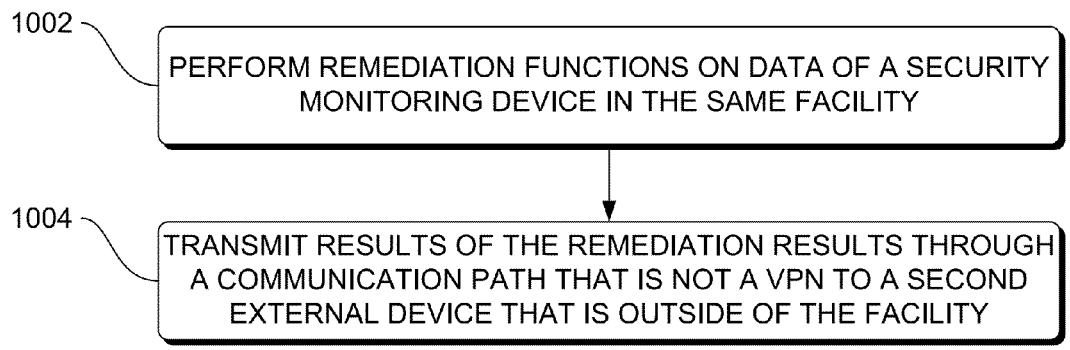
FIG. 10 is a block diagram of a method of correcting electronic security devices for a facility, according to an implementation.

FIG. 10 is a block diagram of a method 1000 of correcting electronic security devices for a facility, according to an implementation.

Method 1000 includes performing auto-remediation functions, such as functions 402 in FIG. 4-5, on data, such as status data 306 of FIG. 4-5, of a security monitoring device, such as first external device 106 in FIG. 1-5 in the same facility, such as facility 102, at block 1002.

Method 1000 thereafter includes transmitting results of the auto-remediation functions, such as remediation results 404 in FIG. 4-5, through a communication path that is not a VPN, such as second communication path 310 in FIG. 4-5, to a second external device, such as second external device 218 in FIG. 2-5, that is outside of the facility, at block 1004.

In some implementations, method 1000 is performed by the auto-remediation component 224 in FIGS. 2 and 4-5.

Figure 11:
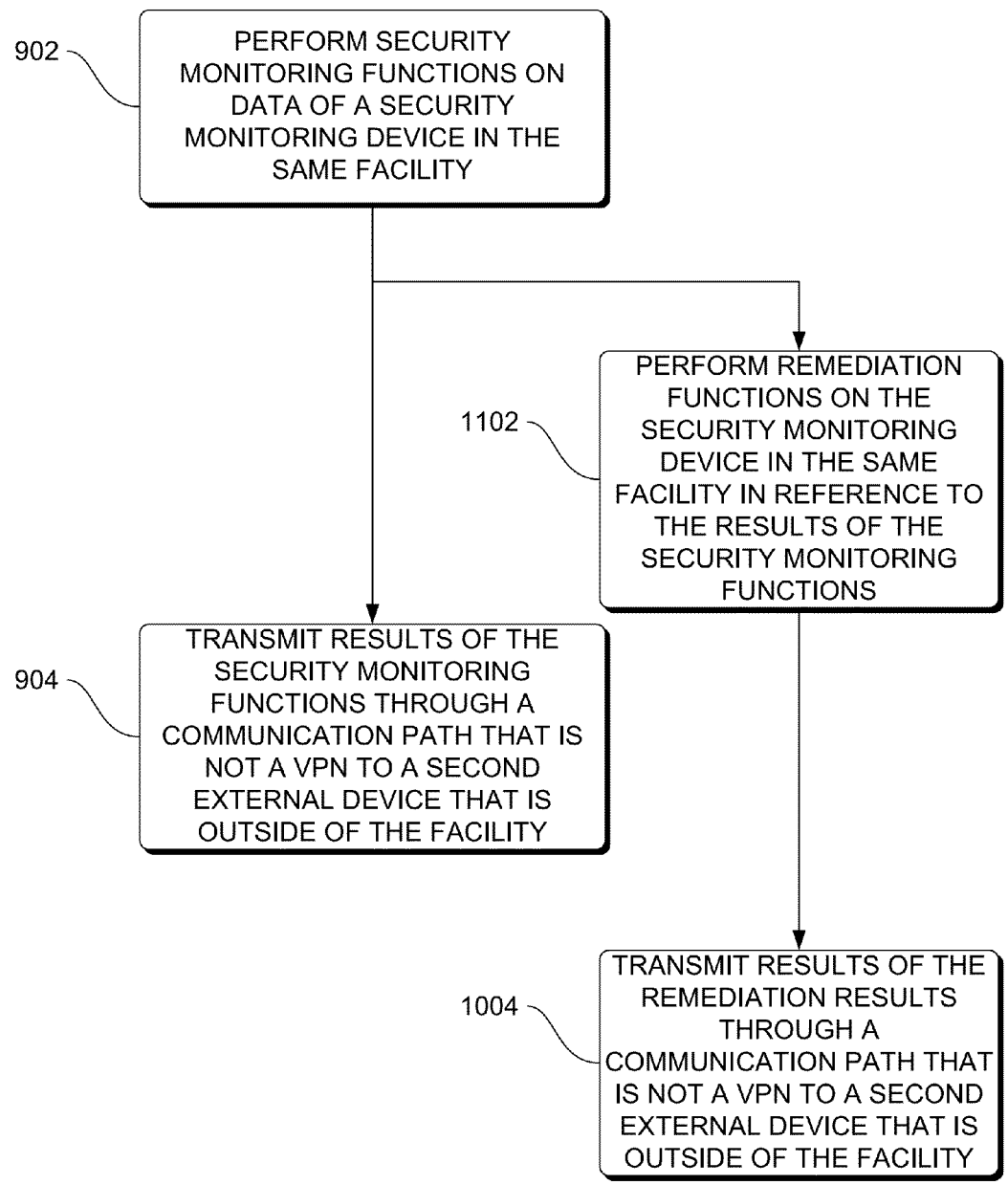
FIG. 11 is a block diagram of a method of monitoring and correcting electronic security devices for a facility, according to an implementation.

FIG. 11 is a block diagram of a method 1100 of monitoring and correcting electronic security devices for a facility, according to an implementation.

Method 1100 includes performing security monitoring functions, such as functions 312 in FIGS. 2 and 5, on data, such as status data 306 of FIG. 3-5, of a security monitoring device, such as first external device 106 in FIG. 1-5 in the same facility, such as facility 102, at block 902.

Method 1100 thereafter includes performing auto-remediation functions, such as functions 402 in FIG. 4-5, on data, such as status data 306 of FIG. 4-5, of a security monitoring device, such as first external device 106 in FIG. 1-5 in the same facility, such as facility 102, in reference to the security monitoring functions, such as security monitoring results 314 in FIGS. 3 and 5, at block 1102.

Method 1100 thereafter block 902 includes transmitting results of the security monitoring functions, such as security monitoring results 314 in FIGS. 3 and 5, through a communication path that is not a VPN, such as second communication path 310 in FIG. 3-5, to a second external device, such as second external device 218 in FIG. 2-5, that is outside of the facility, at block 904.

Method 1100 thereafter block 1102 includes transmitting results of the auto-remediation functions, such as remediation results 404 in FIG. 4-5, through a communication path that is not a VPN, such as second communication path 310 in FIG. 4-5, to a second external device, such as second external device 218 in FIG. 2-5, that is outside of the facility, at block 1004.

Figure 12:
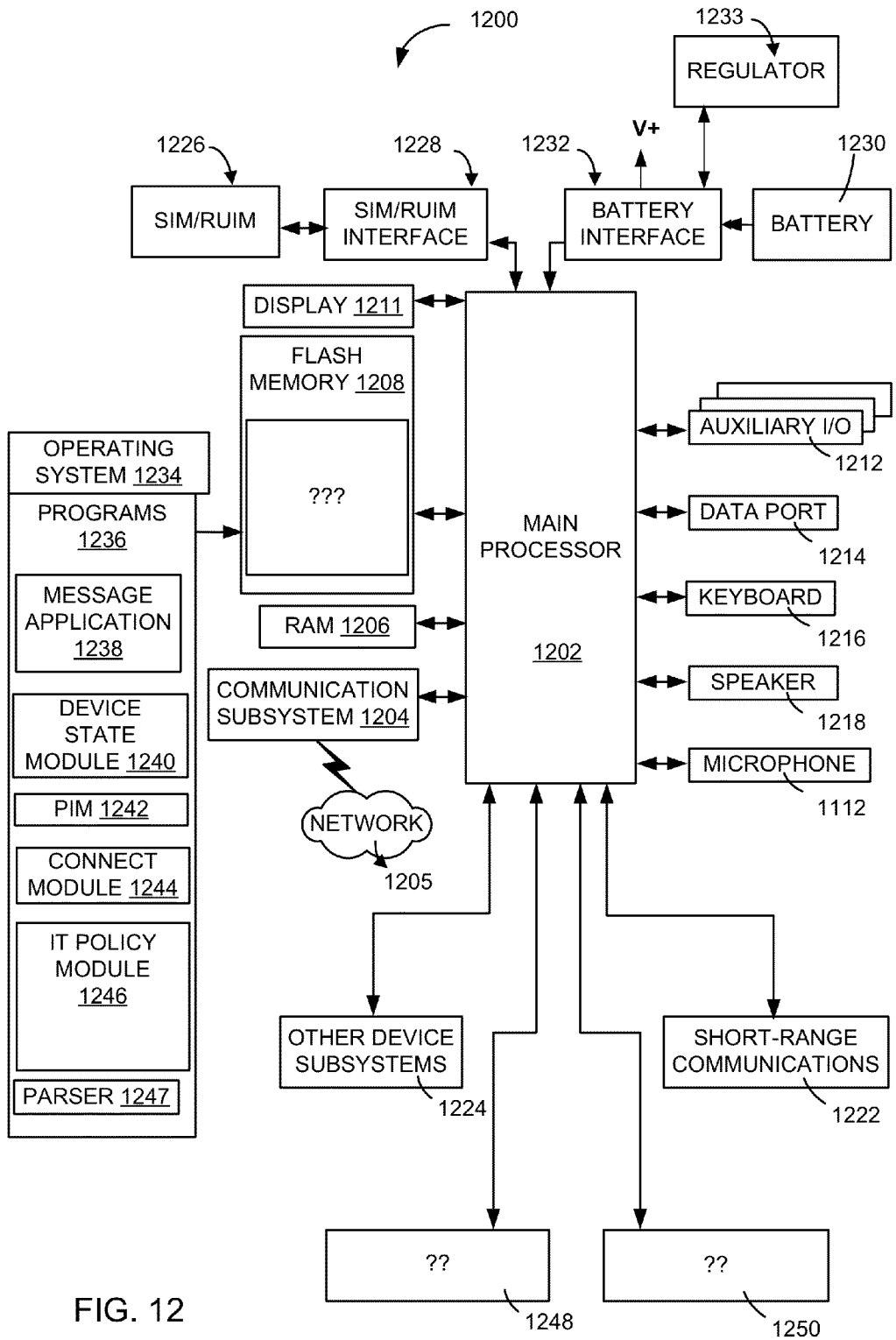
FIG. 12 is a block diagram of a mobile device, according to an implementation.

Methods 900, 1000 and 1100 can be performed by a program executing on, or performed by firmware or hardware that is a part of, a computer, such as sentry devices 200, 300, 400A, 400B, 400C and 500 in FIGS. 2, 3, 4 and 5, respectively, and the mobile device 1200 in FIG. 12.

Hardware and Operating Environment

FIG. 12 is a block diagram of a hardware and operating environment in which different implementations can be practiced. The descriptions provide an overview of computer hardware and a suitable computing environment in conjunction with which some implementations can be implemented. Implementations are described in terms of a computer executing computer-executable instructions. However, some implementations can be implemented entirely in computer hardware in which the computer-executable instructions are implemented in read-only memory. Some implementations can also be implemented in client/server computing environments where remote devices that perform tasks are linked through a communications network. Program modules can be located in both local and remote memory storage devices in a distributed computing environment.

The implementations described herein generally relate to a mobile wireless communication device, hereafter referred to as a mobile device, which can be configured according to an IT policy. It should be noted that the term IT policy, in general, refers to a collection of IT policy rules, in which the IT policy rules can be defined as being either grouped or non-grouped and global or per-user. The terms grouped, non-grouped, global and per-user are defined further below. Examples of applicable communication devices include pagers, cellular phones, cellular smart-phones, wireless organizers, personal digital assistants, computers, laptops, handheld wireless communication devices, wirelessly enabled notebook computers and the like.

FIG. 12 is a block diagram of a mobile device 1200, according to an implementation. The mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities).

Mobile device 1200 is one implementation of mobile device 100 in FIG. 1. The mobile device 1200 includes a number of components such as a main processor 1202 that controls the overall operation of the mobile device 1200. Communication functions, including data and voice communications, are performed through a communication subsystem 1204. The communication subsystem 1204 receives messages from and sends messages to wireless networks 1205. The wireless networks 1205 include the 3G/4G network 110 in FIG. 1. In other implementations of the mobile device 1200, the communication subsystem 1204 can be configured in accordance with the Global System for Mobile Communication (GSM), General Packet Radio Services (GPRS), Enhanced Data GSM Environment (EDGE), Universal Mobile Telecommunications Service (UMTS), data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include Mobitex™ and DataTAC™ network communication systems. Examples of other voice-centric data networks include Personal Communication Systems (PCS) networks like GSM and Time Division Multiple Access (TDMA) systems.

The wireless link connecting the communication subsystem 1204 with the wireless network 1205 represents one or more different Radio Frequency (RF) channels. With newer network protocols, these channels are capable of supporting both circuit switched voice communications and packet switched data communications.

The main processor 1202 also interacts with additional subsystems such as a Random Access Memory (RAM) 1206, a flash memory 1208, a display 1210, an auxiliary input/output (I/O) subsystem 1212, a data port 1214, a keyboard 1216, a speaker 1218, a microphone 1220, short-range communications 1222, other device subsystems 1224, an orientation detection component 1248 such as accelerometer or gyroscope, and at least one solid-state image transducer. In some implementations, the flash memory 1208 includes an image-capture-control component.

Some of the subsystems of the mobile device 1200 perform communication-related functions, whereas other subsystems may provide "resident" or on-device functions. By way of example, the display 1210 and the keyboard 1216 may be used for both communication-related functions, such as entering a text message for transmission over the wireless network 1205, and device-resident functions such as a calculator or task list.

The mobile device 1200 can transmit and receive communication signals over the wireless network 1205 after required network registration or activation procedures have been completed. Network access is associated with a subscriber or user of the mobile device 1200. To identify a subscriber, the mobile device 1200 requires a SIM/RUIM card 1226 (i.e. Subscriber Identity Module or a Removable User Identity Module) to be inserted into a SIM/RUIM interface 1228 in order to communicate with a network. The SIM card or RUIM 1226 is one type of a conventional "smart card" that can be used to identify a subscriber of the mobile device 1200 and to personalize the mobile device 1200, among other things. Without the SIM card 1226, the mobile device 1200 is not fully operational for communication with the wireless network 1205. By inserting the SIM card/RUIM 1226 into the SIM/RUIM interface 1228, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 1226 includes a processor and memory for storing information. Once the SIM card/RUIM 1226 is inserted into the SIM/RUIM interface 1228, it is coupled to the main processor 1202. In order to identify the subscriber, the SIM card/RUIM 1226 can include some user parameters such as an International Mobile Subscriber Identity (IMSI). An advantage of using the SIM card/RUIM 1226 is that a subscriber is not necessarily bound by any single physical mobile device. The SIM card/RUIM 1226 may store additional subscriber information for a mobile device as well, including datebook (or calendar) information and recent call information. Alternatively, user identification information can also be programmed into the flash memory 1208.

The mobile device 1200 is a battery-powered device and includes a battery interface 1232 for receiving one or more batteries 1230. In one or more implementations, the battery 1230 can be a smart battery with an embedded microprocessor. The battery interface 1232 is coupled to a regulator 1233, which assists the battery 1230 in providing power V+ to the mobile device 1200. Although current technology makes use of a battery, future technologies such as micro fuel cells may provide the power to the mobile device 1200.

The mobile device 1200 also includes an operating system 1234 and software components 1236 to 1246 which are described in more detail below. The operating system 1234 and the software components 1236 to 1246 that are executed by the main processor 1202 are typically stored in a persistent store such as the flash memory 1208, which may alternatively be a read-only memory (ROM) or similar storage element (not shown). Those skilled in the art will appreciate that portions of the operating system 1234 and the software components 1236 to 1246, such as specific device applications, or parts thereof, may be temporarily loaded into a volatile store such as the RAM 1206. Other software components can also be included.

The subset of software components 1236 that control basic device operations, including data and voice communication applications, will normally be installed on the mobile device 1200 during its manufacture. Other software applications include a message application 1238 that can be any suitable software program that allows a user of the mobile device 1200 to transmit and receive electronic messages. Various alternatives exist for the message application 1238 as is well known to those skilled in the art. Messages that have been sent or received by the user are typically stored in the flash memory 1208 of the mobile device 1200 or some other suitable storage element in the mobile device 1200. In one or more implementations, some of the sent and received messages may be stored remotely from the mobile device 1200 such as in a data store of an associated host system with which the mobile device 1200 communicates.

The software applications can further include a device state module 1240, a Personal Information Manager (PIM) 1242, and other suitable modules (not shown). The device state module 1240 provides persistence, i.e. the device state module 1240 ensures that important device data is stored in persistent memory, such as the flash memory 1208, so that the data is not lost when the mobile device 1200 is turned off or loses power.

The PIM 1242 includes functionality for organizing and managing data items of interest to the user, such as, but not limited to, e-mail, contacts, calendar events, voice mails, appointments, and task items. A PIM application has the ability to transmit and receive data items via the wireless network 1205. PIM data items may be seamlessly integrated, synchronized, and updated via the wireless network 1205 with the mobile device subscriber's corresponding data items stored and/or associated with a host computer system. This functionality creates a mirrored host computer on the mobile device 1200 with respect to such items. This can be particularly advantageous when the host computer system is the mobile device subscriber's office computer system.

The mobile device 1200 also includes a connect module 1244, and an IT policy module 1246. The connect module 1244 implements the communication protocols that are required for the mobile device 1200 to communicate with the wireless infrastructure and any host system, such as an enterprise system, with which the mobile device 1200 is authorized to interface. Examples of a wireless infrastructure and an enterprise system are given in FIGS. 21 and 22, which are described in more detail below.

The connect module 1244 includes a set of APIs that can be integrated with the mobile device 1200 to allow the mobile device 1200 to use any number of services associated with the enterprise system. The connect module 1244 allows the mobile device 1200 to establish an end-to-end secure, authenticated communication pipe with the host system. A subset of applications for which access is provided by the connect module 1244 can be used to pass IT policy commands from the host system to the mobile device 1200. This can be done in a wireless or wired manner. These instructions can then be passed to the IT policy module 1246 to modify the configuration of the mobile device 1200. Alternatively, in some cases, the IT policy update can also be done over a wired connection.

The IT policy module 1246 receives IT policy data that encodes the IT policy. The IT policy module 1246 then ensures that the IT policy data is authenticated by the mobile device 1200. The IT policy data can then be stored in the flash memory 1208 in its native form. After the IT policy data is stored, a global notification can be sent by the IT policy module 1246 to all of the applications residing on the mobile device 1200. Applications for which the IT policy may be applicable then respond by reading the IT policy data to look for IT policy rules that are applicable.

The IT policy module 1246 can include a parser 1247, which can be used by the applications to read the IT policy rules. In some cases, another module or application can provide the parser. Grouped IT policy rules, described in more detail below, are retrieved as byte streams, which are then sent (recursively) into the parser to determine the values of each IT policy rule defined within the grouped IT policy rule. In one or more implementations, the IT policy module 1246 can determine which applications are affected by the IT policy data and transmit a notification to only those applications. In either of these cases, for applications that are not being executed by the main processor 1202 at the time of the notification, the applications can call the parser or the IT policy module 1246 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 1246 sends an acknowledgement back to the host system to indicate that the IT policy data was received and successfully applied.

Other types of software applications can also be installed on the mobile device 1200. These software applications can be third party applications, which are added after the manufacture of the mobile device 1200. Examples of third party applications include games, calculators, utilities, etc.

The additional applications can be loaded onto the mobile device 1200 through at least one of the wireless network 1205, the auxiliary I/O subsystem 1212, the data port 1214, the short-range communications subsystem 1222, or any other suitable device subsystem 1224. This flexibility in application installation increases the functionality of the mobile device 1200 and may provide enhanced on-device functions, communication-related functions, or both. For example, secure communication applications may enable electronic commerce functions and other such financial transactions to be performed using the mobile device 1200.

The data port 1214 enables a subscriber to set preferences through an external device or software application and extends the capabilities of the mobile device 1200 by providing for information or software downloads to the mobile device 1200 other than through a wireless communication network. The alternate download path may, for example, be used to load an encryption key onto the mobile device 1200 through a direct and thus reliable and trusted connection to provide secure device communication.

The data port 1214 can be any suitable port that enables data communication between the mobile device 1200 and another computing device. The data port 1214 can be a serial or a parallel port. In some instances, the data port 1214 can be a USB port that includes data lines for data transfer and a supply line that can provide a charging current to charge the battery 1230 of the mobile device 1200.

The short-range communications subsystem 1222 provides for communication between the mobile device 1200 and different systems or devices, without the use of the wireless network 1205. For example, the subsystem 1222 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 1204 and input to the main processor 1202. The main processor 1202 will then process the received signal for output to the display 1210 or alternatively to the auxiliary I/O subsystem 1212. A subscriber may also compose data items, such as e-mail messages, for example, using the keyboard 1216 in conjunction with the display 1210 and possibly the auxiliary I/O subsystem 1212. The auxiliary subsystem 1212 may include devices such as: a touch screen, mouse, track ball, infrared fingerprint detector, or a roller wheel with dynamic button pressing capability. The keyboard 1216 is preferably an alphanumeric keyboard and/or telephone-type keypad. However, other types of keyboards may also be used. A composed item may be transmitted over the wireless network 1205 through the communication subsystem 1204.

For voice communications, the overall operation of the mobile device 1200 is substantially similar, except that the received signals are output to the speaker 1218, and signals for transmission are generated by the microphone 1220. Alternative voice or audio I/O subsystems, such as a voice message recording subsystem, can also be implemented on the mobile device 1200. Although voice or audio signal output is accomplished primarily through the speaker 1218, the display 1210 can also be used to provide additional information such as the identity of a calling party, duration of a voice call, or other voice call related information.

Figure 13:
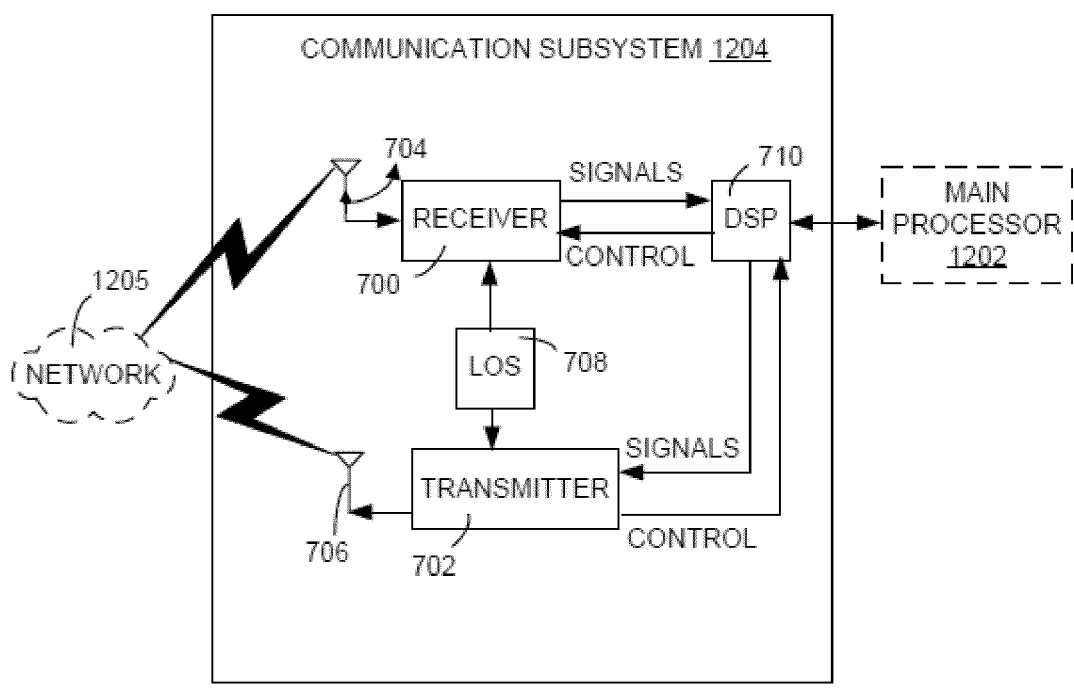
FIG. 13 is a block diagram of the communication subsystem component, according to an implementation.
Figure 14:
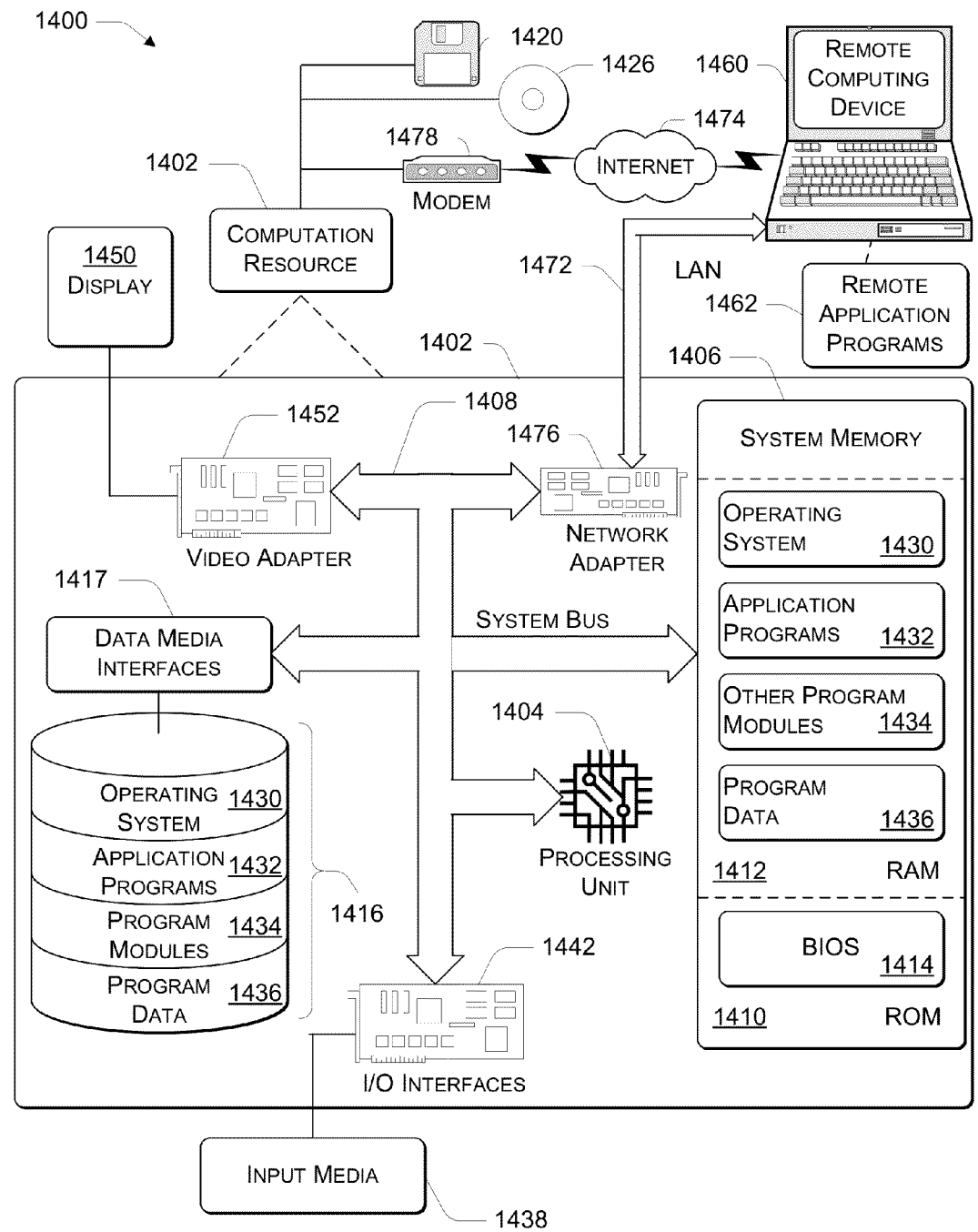
FIG. 14 illustrates an example of a general computer environment useful in the context of the environments of FIG. 1-8, in accordance with an implementation of the disclosed subject matter.

FIG. 13 is a block diagram of the communication subsystem component 1204 is shown, according to an implementation. The communication subsystem 1204 includes a receiver 1300, a transmitter 1302, as well as associated components such as one or more embedded or internal antenna elements 1304 and 1306, Local Oscillators (LOs) 1308, and a processing module such as a Digital Signal Processor (DSP) 1310. The particular implementation of the communication subsystem 1204 is dependent upon the communication wireless network 1205 with which the mobile device 1200 is intended to operate. Thus, it should be understood that the implementation illustrated in FIG. 13 serves only as one example.

Signals received by the antenna 1304 through the wireless network 1205 are input to the receiver 1300, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 1310. In a similar manner, signals to be transmitted are processed, including modulation and encoding, by the DSP 1310. These DSP-processed signals are input to the transmitter 1302 for digital-to-analog (D/A) conversion, frequency up conversion, filtering, amplification and transmission over the wireless network 1205 via the antenna 1306. The DSP 1310 not only processes communication signals, but also provides for receiver and transmitter control. For example, the gains applied to communication signals in the receiver 1300 and the transmitter 1302 may be adaptively controlled through automatic gain control algorithms implemented in the DSP 1310.

The wireless link between the mobile device 1200 and the wireless network 1205 can contain one or more different channels, typically different RF channels, and associated protocols used between the mobile device 1200 and the wireless network 1205. An RF channel is a limited resource that must be conserved, typically due to limits in overall bandwidth and limited battery power of the mobile device 1200.

When the mobile device 1200 is fully operational, the transmitter 1302 is typically keyed or turned on only when it is transmitting to the wireless network 1205 and is otherwise turned off to conserve resources. Similarly, the receiver 1300 is periodically turned off to conserve power until the receiver 1300 is needed to receive signals or information (if at all) during designated time periods.

FIG. 11 illustrates an example of a general computer environment 1100 useful in the context of the environments of FIG. 1-8, in accordance with an implementation of the disclosed subject matter. The general computer environment 1100 includes a computation resource 1102 capable of implementing the processes described herein. It will be appreciated that other devices can alternatively used that include more components, or fewer components, than those illustrated in FIG. 11.

The illustrated operating environment 1100 is only one example of a suitable operating environment, and the example described with reference to FIG. 11 is not intended to suggest any limitation as to the scope of use or functionality of the implementations of this disclosure. Other well-known computing systems, environments, and/or configurations can be suitable for implementation and/or application of the subject matter disclosed herein.

The computation resource 1102 includes one or more processors or processing units 1104, a system memory 1106, and a bus 1108 that couples various system components including the system memory 1106 to processor(s) 1104 and other elements in the environment 1100. The bus 1108 represents one or more of any of several types of bus structures, including a memory bus or memory controller, a peripheral bus, an accelerated graphics port and a processor or local bus using any of a variety of bus architectures, and can be compatible with SCSI (small computer system interconnect), or other conventional bus architectures and protocols.

The system memory 1106 includes nonvolatile read-only memory (ROM) 1110 and random access memory (RAM) 1112, which can or can not include volatile memory elements. A basic input/output system (BIOS) 1114, containing the elementary routines that help to transfer information between elements within computation resource 1102 and with external items, typically invoked into operating memory during startup, is stored in ROM 1110.

The computation resource 1102 further can include a non-volatile read/write memory 1116, represented in FIG. 11 as a hard disk drive, coupled to bus 1108 via a data media interface 1117 (e.g., a SCSI, ATA, or other type of interface); a magnetic disk drive (not shown) for reading from, and/or writing to, a removable magnetic disk 1120 and an optical disk drive (not shown) for reading from, and/or writing to, a removable optical disk 1126 such as a CD, DVD, or other optical media.

The non-volatile read/write memory 1116 and associated computer-readable media provide nonvolatile storage of computer-readable instructions, data structures, program modules and other data for the computation resource 1102. Although the exemplary environment 1100 is described herein as employing a non-volatile read/write memory 1116, a removable magnetic disk 1120 and a removable optical disk 1126, it will be appreciated by those skilled in the art that other types of computer-readable media which can store data that is accessible by a computer, such as magnetic cassettes, FLASH memory cards, random access memories (RAMS), read only memories (ROM), and the like, can also be used in the exemplary operating environment.

A number of program modules can be stored via the non-volatile read/write memory 1116, magnetic disk 1120, optical disk 1126, ROM 1110, or RAM 1112, including an operating system 1130, one or more application programs 1132, other program modules 1134 and program data 1136. Examples of computer operating systems conventionally employed for some types of three-dimensional and/or two-dimensional medical image data include the NUCLEUS® operating system, the LINUX® operating system, and others, for example, providing capability for supporting application programs 1132 using, for example, code modules written in the C++® computer programming language.

A user can enter commands and information into computation resource 1102 through input devices such as input media 1138 (e.g., keyboard/keypad, tactile input or pointing device, mouse, foot-operated switching apparatus, joystick, touchscreen or touchpad, microphone, antenna etc.). Such input devices 1138 are coupled to the processing unit 1104 through a conventional input/output interface 1142 that is, in turn, coupled to the system bus. A monitor 1150 or other type of display device is also coupled to the system bus 1108 via an interface, such as a video adapter 1152.

The computation resource 1102 can include capability for operating in a networked environment (as illustrated in FIG. 2-5, for example) using logical connections to one or more remote computers, such as a remote computer 1160. The remote computer 1160 can be a personal computer, a server, a router, a network PC, a peer device or other common network node, and typically includes many or all of the elements described above relative to the computation resource 1102. In a networked environment, program modules depicted relative to the computation resource 1102, or portions thereof, can be stored in a remote memory storage device such as can be associated with the remote computer 1160. By way of example, remote application programs 1162 reside on a memory device of the remote computer 1160. The logical connections represented in FIG. 11 can include interface capabilities, a storage area network (SAN, not illustrated in FIG. 11), local area network (LAN) 1172 and/or a wide area network (WAN) 1174, but can also include other networks.

Such networking environments are commonplace in modern computer systems, and in association with intranets and the Internet. In certain implementations, the computation resource 1102 executes an Internet Web browser program (which can optionally be integrated into the operating system 1130), such as the "Internet Explorer®" Web browser manufactured and distributed by the Microsoft Corporation of Redmond, Wash.

When used in a LAN-coupled environment, the computation resource 1102 communicates with or through the local area network 1172 via a network interface or adapter 1176. When used in a WAN-coupled environment, the computation resource 1102 typically includes interfaces, such as a modem 1178, or other apparatus, for establishing communications with or through the WAN 1174, such as the Internet. The modem 1178, which can be internal or external, is coupled to the system bus 1108 via a serial port interface.

In a networked environment, program modules depicted relative to the computation resource 1102, or portions thereof, can be stored in remote memory apparatus. It will be appreciated that the network connections shown are exemplary, and other means of establishing a communications link between various computer systems and elements can be used.

A user of a computer can operate in a networked environment 2100 using logical connections to one or more remote computers, such as a remote computer 1160, which can be a personal computer, a server, a router, a network PC, a peer device or other common network node. Typically, a remote computer 1160 includes many or all of the elements described above relative to the computer 1100 of FIG. 11.

The computation resource 1102 typically includes at least some form of computer-readable media. Computer-readable media can be any available media that can be accessed by the computation resource 1102. By way of example, and not limitation, computer-readable media can comprise computer storage media and communication media.

Computer storage media include volatile and nonvolatile, removable and non-removable media, implemented in any method or technology for storage of information, such as computer-readable instructions, data structures, program modules or other data. The term "computer storage media" includes, but is not limited to, RAM, ROM, EEPROM, FLASH memory or other memory technology, CD, DVD, or other optical storage, magnetic cassettes, magnetic tape, magnetic disk storage or other magnetic storage devices, or any other media which can be used to store computer-intelligible information and which can be accessed by the computation resource 1102.

Communication media typically embodies computer-readable instructions, data structures, program modules.

By way of example, and not limitation, communication media include wired media, such as wired network or direct-wired connections, and wireless media, such as acoustic, RF, infrared and other wireless media. The scope of the term computer-readable media includes combinations of any of the above.

More specifically, in the computer-readable program implementation, the programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (API) or inter-process communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components execute on as few as one computer as in general computer environment 1100 in FIG. 11, or on at least as many computers as there are components.

CONCLUSION

An in-facility security device monitoring system is described. A technical effect is processing of the status of the security devices on-site and behind a firewall and transmitting to the outside of the facility firewall through insecure communication channels only the results of the processing. Although specific implementations have been illustrated and described herein, it will be appreciated by those of ordinary skill in the art that any arrangement which is calculated to achieve the same purpose may be substituted for the specific implementations shown. This disclosure is intended to cover any adaptations or variations. For example, although described in procedural terms, one of ordinary skill in the art will appreciate that implementations can be made in an object-oriented design environment or any other design environment that provides the required relationships.

In particular, one of skill in the art will readily appreciate that the names of the methods and apparatus are not intended to limit implementations. Furthermore, additional methods and apparatus can be added to the components, functions can be rearranged among the components, and new components to correspond to future enhancements and physical devices used in implementations can be introduced without departing from the scope of implementations. One of skill in the art will readily recognize that implementations are applicable to future security monitoring devices, new communication paths, and different techniques of security monitoring techniques.

The terminology used in this application is meant to include all servers, processors and alternate technologies which provide the same functionality as described herein.

What is claimed is:

1. A sentry device for monitoring electronic security devices for a facility, the device comprising:
   a processor;
   a first communication port that is operably coupled to the processor and operable to establish a first communication path to a first external device, the first external device being external to the sentry device, the first external device being physically located in the facility, the first communication path not being a virtual private network, the first communication path not including a computer firewall and the first communication path operable to communicate status data of the first external device;
   a second communication port that is operably coupled to the processor and operable to establish a second communication path to a second external device, the second external device being external to the sentry device, the second external device being physically located in the facility, the second communication path not being a virtual private network, the second communication path including a computer firewall;
   a sentry component that is operably coupled to the processor, that is operably coupled to the first communication port and that is operably coupled to the second communication port, the sentry component including processor-executable instructions that are operable to:
      perform security monitoring functions of the first external device, yielding security monitoring results; and
      transmitting the security monitoring results through the second communication path;
   an auto-remediation component that is operably coupled to the processor, that is operably coupled to the first communication port and that is operably coupled to the second communication port, the auto-remediation component including processor-executable instructions that are operable to:
      in response to the security monitoring results, perform remediation functions on the first external device without intervention by another entity, yielding remediation results; and
      transmitting the remediation results through the second communication path.

2. The sentry device of claim 1 wherein the computer firewall further comprises:
   a software computer firewall.

3. The sentry device of claim 1 wherein the computer firewall further comprises:
   a hardware computer firewall.

4. The sentry device of claim 1 wherein the security monitoring functions further comprises:
   Simple Network Management Protocol security monitoring functions.

5. The sentry device of claim 1, wherein the entity further comprises:
   a human.

6. The sentry device of claim 1 wherein the first external device further comprises:
   a physical security monitoring device.

7. The sentry device of claim 1 wherein the second external device further comprises:
   a server.

8. An auto-remediation device for monitoring electronic security devices for a facility, the device comprising:
- a processor;
- a first communication port that is operably coupled to the processor and operable to establish a first communication path to a first external device, the first external device being external to the auto-remediation device, the first external device being physically located in the facility, the first communication path not being a virtual private network, the first communication path not including a computer firewall;
- a second communication port that is operably coupled to the processor and operable to establish a second communication path to a second external device, the second external device being external to the auto-remediation device, the second external device being physically located in the facility, the second communication path not being a virtual private network, the second communication path including a computer firewall; and
- an auto-remediation component that is operably coupled to the processor, that is operably coupled to the first communication port and that is operably coupled to the second communication port, the auto-remediation component including processor-executable instructions that are operable to:
  - perform remediation functions on the first external device without intervention by another entity, yielding remediation results; and
  - transmitting the remediation results through the second communication path;
- a sentry component that is operably coupled to the processor, that is operably coupled to the first communication port and that is operably coupled to the second communication port, the sentry component including processor-executable instructions that are operable to:
  - perform security monitoring functions of the first external device, yielding security monitoring results; and
  - transmitting the security monitoring results through the second communication path.

9. The auto-remediation device of claim 8 wherein the computer firewall further comprises:
- a software computer firewall.

10. The auto-remediation device of claim 8 wherein the computer firewall further comprises:
- a hardware computer firewall.

11. The auto-remediation device of claim 8 wherein the entity further comprises:
- a human.

12. The auto-remediation device of claim 8 wherein the first external device further comprises:
- a physical security monitoring device.

13. The auto-remediation device of claim 8 wherein the second external device further comprises:
- a server.

14. The auto-remediation device of claim 8, wherein the security monitoring functions of the sentry component further comprise:
- Simple Network Management Protocol security monitoring functions.

15. A method of monitoring electronic security devices for a facility, the method comprising:
- establishing a first communication path to a first external device via a first communication port, the first external device being external to the first communication port, the first communication path not being a virtual private network, the first communication path not including a computer firewall and the first communication path operable to communicate status data of the first external device;
- establishing a second communication path to a second external device via a second communication port, the second external device being external to the second communication port, the second communication path not being a virtual private network, the second communication path including a computer firewall;
- performing security monitoring functions of the first external device in reference to the status data of the first external device, yielding security monitoring results; and
- transmitting the security monitoring results through the second communication path to the second external device;
- in response to the security monitoring results, performing remediation functions on the first external device without intervention by another entity, yielding remediation results; and
- transmitting the remediation results through the second communication path to the second external device.

16. The method of claim 15 wherein the security monitoring functions further comprises:
- Simple Network Management Protocol security monitoring functions.

17. The method of claim 15, wherein the entity further comprises: a human.

* * * * *